US012341713B2

(12) United States Patent
Horn et al.

(10) Patent No.: US 12,341,713 B2
(45) Date of Patent: Jun. 24, 2025

(54) DEDICATED PILOT SIGNALS ASSOCIATED WITH RADIO FREQUENCY IMPAIRMENT COMPENSATION

(71) Applicant: QUALCOMM Incorporated, San Diego, CA (US)

(72) Inventors: Idan Michael Horn, Hod Hasharon (IL); Shay Landis, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 17/868,049

(22) Filed: Jul. 19, 2022

(65) Prior Publication Data

US 2024/0031085 A1 Jan. 25, 2024

(51) Int. Cl.
*H04W 72/51* (2023.01)
*H04L 5/00* (2006.01)
*H04W 72/0446* (2023.01)

(52) U.S. Cl.
CPC .......... *H04L 5/0007* (2013.01); *H04L 5/0048* (2013.01); *H04L 5/006* (2013.01); *H04W 72/0446* (2013.01); *H04W 72/51* (2023.01)

(58) Field of Classification Search
CPC ..... H04L 5/0007; H04L 5/0048; H04L 5/006; H04W 72/51; H04W 72/0446
See application file for complete search history.

(56) References Cited

U.S. PATENT DOCUMENTS

| 2019/0123840 | A1* | 4/2019 | Siomina | H04W 24/00 |
| 2021/0218532 | A1* | 7/2021 | Yunusov | H04L 5/0053 |
| 2021/0328837 | A1 | 10/2021 | Pick et al. | |
| 2022/0053400 | A1* | 2/2022 | Ljung | H04W 36/0061 |
| 2022/0141064 | A1 | 5/2022 | Horn et al. | |

OTHER PUBLICATIONS

International Search Report and Written Opinion—PCT/US2023/067616—ISA/EPO—Sep. 8, 2023 (2202628WO).

\* cited by examiner

*Primary Examiner* — Kent Krueger
(74) *Attorney, Agent, or Firm* — Holland & Hart LLP/Qualcomm

(57) ABSTRACT

This disclosure provides systems, methods and apparatus, including computer programs encoded on computer storage media, for dedicated pilot signals associated with radio frequency impairment compensation. In some aspects, a user equipment (UE) and a network entity may support a signaling mechanism according to which the UE may measure and report, to the network entity, an imbalance between an in-phase (I) component and a quadrature (Q) component of a modulated signal. For example, the UE may request the network entity to transmit an out-of-band pilot signal to enable frequency domain residual side band (FDRSB) estimation at the UE and the UE may transmit measurement information associated with the IQ imbalance or the FDRSB estimation to the network entity. The network entity may receive the measurement information and compensate or correct signaling in accordance with the received measurement information.

20 Claims, 9 Drawing Sheets

DEDICATED PILOT SIGNALS ASSOCIATED WITH RADIO FREQUENCY IMPAIRMENT COMPENSATION

TECHNICAL FIELD

This disclosure relates to wireless communications, including dedicated pilot signals associated with radio frequency impairment compensation.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include transmitting an indication of a capability of the UE associated with measuring an imbalance between an in-phase component and a quadrature component of a modulated signal, monitoring a wireless channel for a pilot signal associated with measuring the imbalance in accordance with the capability of the UE, and transmitting information corresponding to a measurement of the imbalance at the UE, where the measurement of the imbalance is associated with the pilot signal.

Another innovative aspect of the subject matter described in this disclosure can be implemented in an apparatus for wireless communications at a UE. The apparatus may include one or more interfaces and a processing system. The one or more interfaces may be configured to output an indication of a capability of the UE associated with measuring an imbalance between an in-phase component and a quadrature component of a modulated signal, monitor a wireless channel for a pilot signal associated with measuring the imbalance in accordance with the capability of the UE, and output information corresponding to a measurement of the imbalance at the UE, where the measurement of the imbalance is associated with the pilot signal.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to transmit an indication of a capability of the UE associated with measuring an imbalance between an in-phase component and a quadrature component of a modulated signal, monitor a wireless channel for a pilot signal associated with measuring the imbalance in accordance with the capability of the UE, and transmit information corresponding to a measurement of the imbalance at the UE, where the measurement of the imbalance is associated with the pilot signal.

Another innovative aspect of the subject matter described in this disclosure can be implemented in another apparatus for wireless communications at a UE. The apparatus may include means for transmitting an indication of a capability of the UE associated with measuring an imbalance between an in-phase component and a quadrature component of a modulated signal, means for monitoring a wireless channel for a pilot signal associated with measuring the imbalance in accordance with the capability of the UE, and means for transmitting information corresponding to a measurement of the imbalance at the UE, where the measurement of the imbalance is associated with the pilot signal.

Another innovative aspect of the subject matter described in this disclosure can be implemented in a non-transitory computer-readable medium storing code for wireless communications at a UE. The code may include instructions executable by a processor to transmit an indication of a capability of the UE associated with measuring an imbalance between an in-phase component and a quadrature component of a modulated signal, monitor a wireless channel for a pilot signal associated with measuring the imbalance in accordance with the capability of the UE, and transmit information corresponding to a measurement of the imbalance at the UE, where the measurement of the imbalance is associated with the pilot signal.

Another innovative aspect of the subject matter described in this disclosure can be implemented in a method for wireless communications at a network entity. The method may include receiving an indication of a capability of a UE associated with measuring an imbalance between an in-phase component and a quadrature component of a modulated signal, transmitting a pilot signal associated with measuring the imbalance in accordance with the capability of the UE, and receiving information corresponding to a measurement of the imbalance at the UE, where the measurement of the imbalance is associated with the pilot signal.

Another innovative aspect of the subject matter described in this disclosure can be implemented in an apparatus for wireless communications at a network entity. The apparatus may include one or more interfaces and a processing system. The one or more interfaces may be configured to obtain an indication of a capability of a UE associated with measuring an imbalance between an in-phase component and a quadrature component of a modulated signal, output a pilot signal associated with measuring the imbalance in accordance with the capability of the UE, and obtain information corresponding to a measurement of the imbalance at the UE, where the measurement of the imbalance is associated with the pilot signal.

Another innovative aspect of the subject matter described in this disclosure can be implemented in an apparatus for wireless communications at a network entity. The apparatus may include a processor, memory coupled with the processor, and instructions stored in the memory. The instructions may be executable by the processor to cause the apparatus to receive an indication of a capability of a UE associated with measuring an imbalance between an in-phase component and a quadrature component of a modulated signal, transmit a pilot signal associated with measuring the imbalance in accordance with the capability of the UE, and receive information corresponding to a measurement of the imbalance at the UE, where the measurement of the imbalance is associated with the pilot signal.

Another innovative aspect of the subject matter described in this disclosure can be implemented in another apparatus for wireless communications at a network entity. The apparatus may include means for receiving an indication of a capability of a UE associated with measuring an imbalance between an in-phase component and a quadrature component of a modulated signal, means for transmitting a pilot signal associated with measuring the imbalance in accordance with the capability of the UE, and means for receiving information corresponding to a measurement of the imbalance at the UE, where the measurement of the imbalance is associated with the pilot signal.

Another innovative aspect of the subject matter described in this disclosure can be implemented in a non-transitory computer-readable medium storing code for wireless communications at a network entity. The code may include instructions executable by a processor to receive an indication of a capability of a UE associated with measuring an imbalance between an in-phase component and a quadrature component of a modulated signal, transmit a pilot signal associated with measuring the imbalance in accordance with the capability of the UE, and receive information corresponding to a measurement of the imbalance at the UE, where the measurement of the imbalance is associated with the pilot signal.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
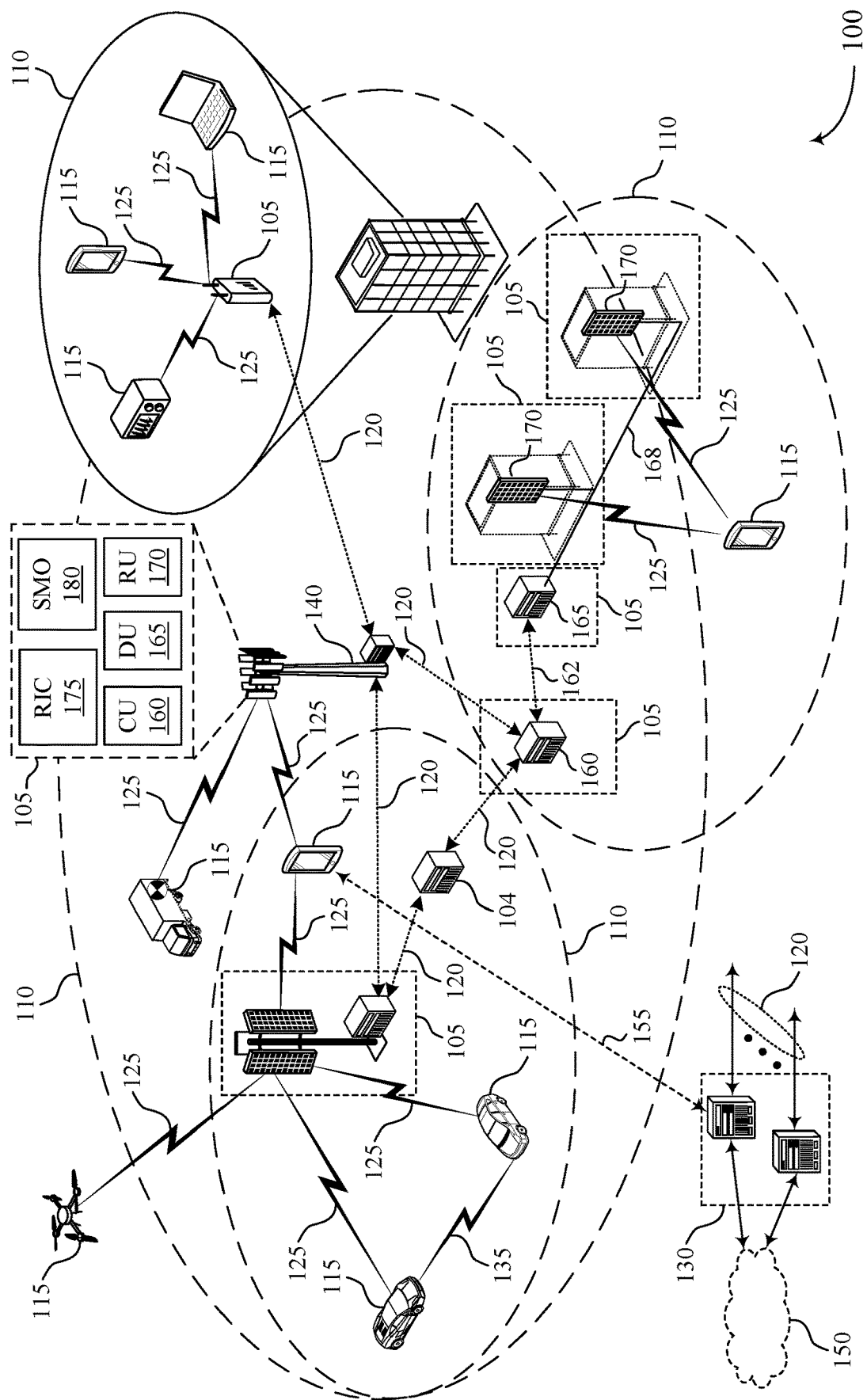
FIG. 1 shows an example wireless communications system that supports dedicated pilot signals associated with radio frequency impairment compensation.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G) or fifth generation (5G), or further implementations thereof, technology.

In some wireless communications systems, wireless transmissions may suffer from RF impairments, such as in-phase and quadrature (IQ) imbalances. An IQ imbalance (such as an imbalance between an in-phase (I) component of a signal and a quadrature (Q) component of a signal) may distort a signal, which may degrade performance and introduce noise that limits an achievable signal-to-noise ratio (SNR) at a receiver. Further, while wireless communication via relatively higher RF bands may provide higher data rates, an IQ imbalance of a signal sent via a relatively higher RF band may increase a sensitivity of the signal to adverse channel conditions. In some deployments, a receiver may attempt to compensate for the added sensitivity, which may increase complexity and power consumption at the receiver. For example, some receiver-based IQ imbalance correction techniques may involve an operation of an increase quantity of components, each of which may draw power and add to device complexity.

In some implementations, a user equipment (UE) and a network entity may support a signaling mechanism according to which the UE may measure and report an IQ imbalance to the network entity to enable the network entity to compensate or correct for the IQ imbalance. For example, the UE may monitor a wireless channel for a pilot signal associated with measuring the IQ imbalance and may transmit information corresponding to a measurement of the IQ imbalance to the network entity. As such, the network entity may compensate for the reported IQ imbalance and transmit a data message to the UE in accordance with the compensation. In some implementations, the UE may transmit an indication of a capability of the UE to measure the IQ imbalance and the network entity may configure the UE to monitor for the pilot signal in accordance with the capability of the UE. Further, the network entity may transmit the pilot signal using an out-of-band resource and, in some implementations, may coordinate with one or more other network entities to indicate the one or more other network entities to avoid transmitting using a same set of resources as the network entity uses for the pilot signal.

Particular implementations of the subject matter described in this disclosure can be implemented to realize one or more of the following potential advantages. For example, in accordance with supporting such a signaling mechanism according to which a UE may measure and report an IQ imbalance to a network entity, the network entity (functioning as a transmitter) may pro-actively compensate for the reported IQ imbalance such that data messages transmitted by the network entity to the UE are received at the UE with less of a perceived IQ imbalance. As such, the UE may reduce or eliminate IQ imbalance compensation at the UE, which may reduce complexity and power consumption at the UE. Accordingly, the UE may achieve greater power savings and experience a longer battery life. Further, in implementations in which the network entity designs the pilot signal in accordance with the capability of the UE (such that the pilot signal is associated with dedicated IQ imbalance pilots), the UE may obtain more accurate residual side band (RSB) estimations, which may result in more accurate IQ imbalance reporting and, in turn, greater throughput. Additionally, the network entity may transmit such a pilot signal associated with IQ imbalance measurement relatively infrequently (such as with a low periodicity) such that pilots overheard may be relatively small or negligible. In accordance with facilitating greater throughput while maintaining low or negligible overhead, the UE and the network entity may achieve higher data rates, greater system capacity, and greater spectral efficiency, among other benefits.

FIG. 1 shows an example wireless communications system 100 that supports dedicated pilot signals associated with radio frequency impairment compensation. The wireless communications system 100 may include one or more network entities 105, one or more UEs 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various implementations, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as a radio frequency (RF) access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, stand-alone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof. An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending upon which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support dedicated pilot signals associated with radio frequency impairment compensation as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

Signal waveforms transmitted via a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, in some implementations, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed for communication using a carrier according to various techniques. A physical control channel and a physical data channel may be multiplexed for signaling via a downlink carrier, for example, using one or more time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other implementations, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHz.

The wireless communications system 100 also may operate using a super high frequency (SHF) region, which may be in the range of 3 GHz to 30 GHz, also known as the centimeter band, or using an extremely high frequency (EHF) region of the spectrum (such as from 30 GHz to 300 GHz), also known as the millimeter band. In some implementations, the wireless communications system 100 may support millimeter wave (mmW) communications between the UEs 115 and the network entities 105 (such as BSs 140, RUs 170), and EHF antennas of the respective devices may be smaller and more closely spaced than UHF antennas. In some implementations, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be based on a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

In some wireless communications systems, such as the wireless communications system 100, communicating devices may transmit signaling to each other over-the-air (OTA). Such OTA signaling may be referred to as RF signaling and, in some aspects, such signaling may suffer from one or more RF impairments. RF impairments may arise from various sources and in various forms, including an IQ imbalance in an analog part of a transceiver chain at one or both of a transmitter side and a receiver side. In some scenarios, an IQ imbalance may result in a signal distortion that degrades performance and introduces a noise floor (such as a noise floor of between approximately 10 dB and 20 dB) that limits an operational or achievable SNR at the receiver side. For example, an IQ imbalance may introduce intercarrier interference (ICI) from an adjacent carrier or subcarrier.

IQ imbalances may arise for one or more specific types of receiver, such as a direct conversion receiver. A direct conversion receiver may translate a received RF signal directly from a carrier wave to a baseband using a mixing stage (such as a single mixing stage) associated with one or more quadrature mixers. A receiver (such as a direct conversion receiver) may include a local oscillator (LO) that generates both a sine wave at the received carrier frequency and a copy that is delayed by 90 degrees. These waves are individually mixed with the RF signal to produce an I signal (such as an I component of a signal) and a Q signal (such as a Q component of a signal). In some deployments, the phase difference between the I component and the Q component may not be exactly 90 degrees and parallel sections of circuitry associated with the two signal components (such as the two signal paths) may have varying gains (such that a gain is not perfectly matched between the parallel sections of circuitry). An IQ imbalance may arise from the deviation of the phase difference between the I component and the Q component from 90 degrees or from the different path gains, or from a combination thereof. As such, in some systems, a receiver may be designed to control or compensate for an IQ imbalance to limit errors in a demodulated signal.

Further, some systems or deployments may support high bandwidth communication at relatively high frequencies, such as frequencies in the sub-terahertz (THz) band. For example, sub-THz communication may facilitate and support high bandwidth communication with relatively higher throughputs (as compared to communication via relatively lower RF bands). Communication using high bandwidth, however, may create multiple challenges. For example, an IQ imbalance in a high bandwidth may increase receiver complexity, increase sensitivity to channel conditions, and degrade performance in terms of SNR or likelihood of successful communication. Further, a baseband transmission architecture (instead of an intermediate frequency (IF) technique, which may not involve IQ imbalance correction) may be used due to a high sampling rate of one or more digital-to-analog converters (DACs) or one or more analog-to-digital converters (ADCs). A baseband architecture may effectively reduce a sampling rate by approximately half at the cost of approximately twice the quantity of components (such as approximately twice the quantity of DACs or ADCs). Further, high bandwidth communication may increase model power consumption. For example, IQ imbalance compensation performed in the digital domain may consume a relatively large part of the available digital power and may consume even more power during sub-THz communication.

In some systems, one or more devices may employ a frequency domain RSB (FDRSB)-based estimation and calibration technique associated with an IQ imbalance. FDRSM estimation may be obtained in a single step with correct signaling and multiple steps of FDRSB also may be applied, as illustrated by and described in more detail with reference to FIG. 5. FDRSB-based estimation and calibration, however, may be associated with challenges if applying FDRSB on relatively large bandwidths. For example, in an example of an estimated IQ imbalance with a 7.5 gigahertz (GHz) bandwidth (such that the imbalance is estimated over a full bandwidth of pilots), the IQ impairment response may change significantly across the frequency domain and a noise floor that the IQ impairment causes may reach up to approximately 7 dB in terms of a signal-to-interference-plus-noise ratio (SINR). Further, in an SINR plot associated with FDRSM estimation and calibration, an SINR may degrade significantly near the edges or borders of a bandwidth. For example, near the edges of a bandwidth, SINR may degrade from approximately 36 dB to approximately 27 dB.

Accordingly, in some implementations, a UE 115 and a network entity 105 may support a pilot pattern (such as a pattern of a pilot signal) that is transmitted outside of an allocated bandwidth. In some aspects, the UE 115 and the network entity 105 may support such an out-of-band pilot signal for a slot during which FDRSB estimation is to be performed and may refrain from using such an out-of-band pilot signal in slots during which FDRSB is not expected to be performed. Thus, in some implementations, the network entity 105 may transmit one or more pilots (such as one or more pilots that are dedicated for IQ imbalance measurement) that are located both in in-band subcarriers and out-of-band subcarriers to enable the UE 115 to more accurately estimate an IQ impairment (such as to be able to more accurately measure and compensate for an IQ impairment near the edges of a bandwidth.

In some implementations, the UE 115 or the network entity 105, or both, may perform cell coordination to support a usage of an out-of-band pilot signal (such as to avoid interfering with other communications within the wireless communications system 100 that may be performed on a neighbor carrier or sub-carrier. Further, in some implementations, the UE 115 may measure the pilot signal and transmit information associated with the measurement of the pilot signal to the network entity 105. As such, the network entity 105 may correct for both transmit-side and receive-side impairments, which may reduce power consumption at the UE 115.

Figure 2:
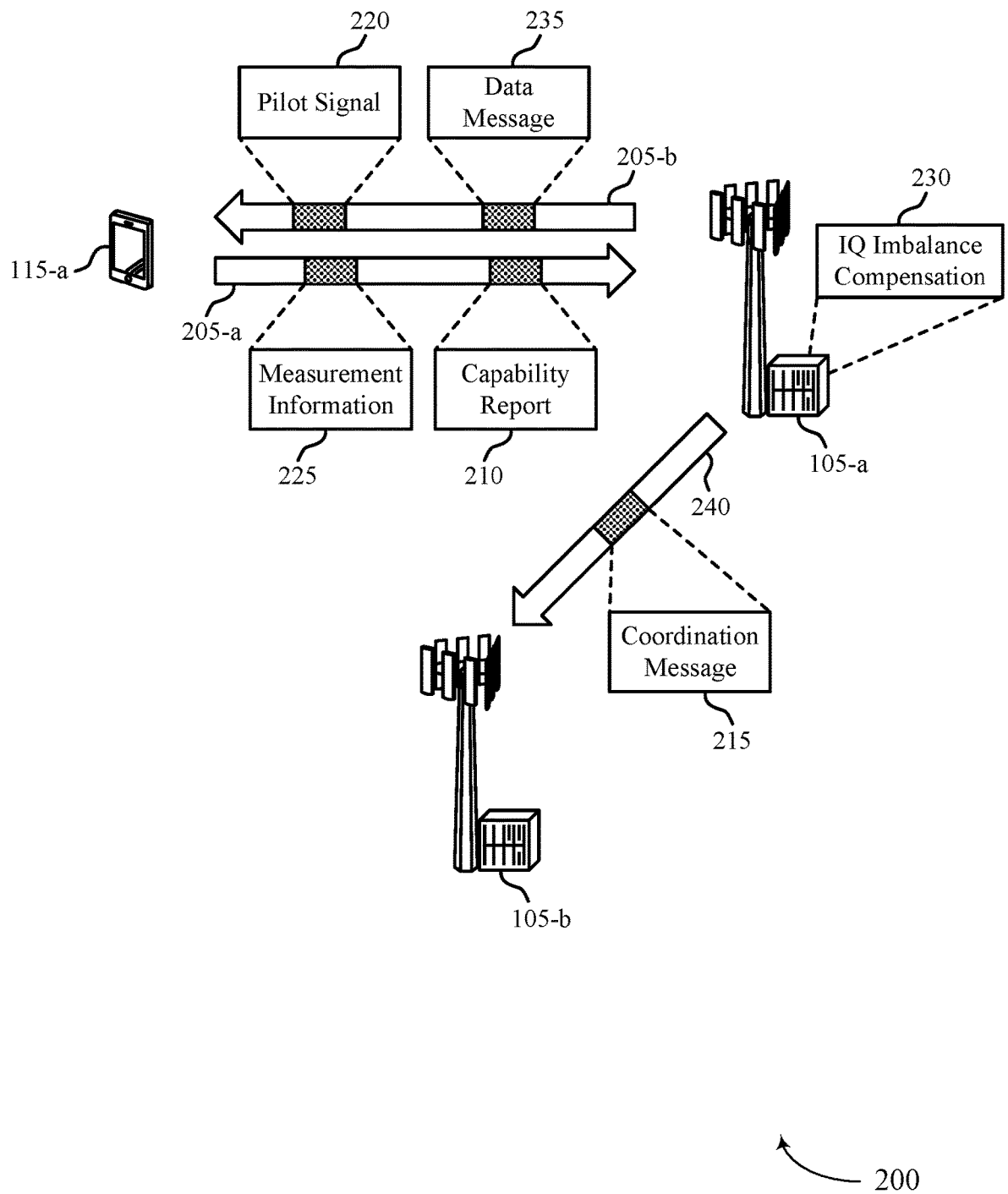
FIG. 2 shows an example signaling diagram that supports dedicated pilot signals associated with radio frequency impairment compensation.

FIG. 2 shows an example signaling diagram 200 that supports dedicated pilot signals associated with radio frequency impairment compensation. The signaling diagram 200 may implement or be implemented to realize aspects of the wireless communications system 100. For example, the signaling diagram 200 illustrates communication between a UE 115-*a*, a network entity 105-*a*, and a network entity 105-*b*. The UE 115-*a* may be an example of a UE 115 as illustrated by and described with reference to FIG. 1. The network entity 105-*a* and the network entity 105-*b* may each be examples of a network entity 105 as illustrated by and described with reference to FIG. 1. In some implementations, the UE 115-*a* and the network entity 105-*a* may support a signaling mechanism according to which the UE 115-*a* may measure a dedicated pilot signal associated with IQ imbalance measurements and report the IQ imbalance measurements to the network entity 105-*a* for pro-active transmit-side compensation.

As illustrated by the signaling diagram 200, the UE 115-*a* may communicate with the network entity 105-*a* via a communication link 205, which may generally refer to any one or more of a communication link 205-*a* and a communication link 205-*b*. The communication link 205-*a* may be an example of an uplink and the communication link 205-*b* may be an example of a downlink. Further, although described with reference to FIG. 2 in the context of being transmitted from the network entity 105-*a* to the UE 115-*a*, the described implementations may be used for network entity-to-UE communication as well as for network entity-to-network entity communication (such as fronthaul or backhaul communication).

For example, to facilitate more accurate transmit- and receive-side IQ impairment estimation (and, likewise, more accurate compensation), the UE 115-*a* and the network entity 105-*a* may support a pilot mapping associated with a relatively larger bandwidth than an allocated downlink bandwidth (such that pilots are transmitted both in-band and out-of-band) and a signaling mechanism according to which the UE 115-*a* estimates the IQ impairments and reports back to the network entity 105-*a* for compensation at the network entity 105-*a*.

In some implementations, the UE 115-*a* may transmit a capability report 210 associated with IQ imbalance compensation to the network entity 105-*a*. For example, the capability report 210 may include an indication of a capability of the UE 115-*a* associated with measuring an imbalance between an I component and a Q component of a modulated signal. In other words, the UE 115-*a* may report a capability of the UE 115-*a* to estimate an IQ imbalance (such as a capability to estimate an IQ imbalance on a full or complete bandwidth). In some implementations, the capability to estimate an IQ imbalance may be reported per frequency band. In some aspects, the UE 115-*a* may transmit the capability report 210 to the network entity 105-*a* at connection establishment.

The indication of the capability of the UE 115-*a* associated with the IQ imbalance measurement conveyed in the capability report 210 may be associated with various aspects relating to the capability of the UE 115-*a*. In some implementations, for example, the capability report 210 may include an indication of an IQ imbalance correction method supported by the UE 115-*a* or that the UE 115-*a* otherwise requests the network entity 105-*a* to use. The IQ imbalance correction method may be a frequency dependent IQ imbalance correction method or a wideband IQ imbalance correction method. Additionally, or alternatively, the capability report 210 may include an indication of a resource allocation associated with the IQ imbalance measurement. For example, the UE 115-*a* may request a pilots allocation (such as whether the allocation can include or not include out-of-band pilots) via the capability report 210. In such examples, the UE 115-*a* may request or indicate a quantity of resource blocks (RBs) to be allocated out-of-band. Additionally, or alternatively, the capability report 210 may include an indication of whether the UE 115-*a* expects the network entity 105-*a* to correct an IQ imbalance. For example, the UE 115-*a* may request the network entity 105-*a* to correct one or both of a receive-side IQ imbalance or a transmit-side imbalance via the capability report 210.

In accordance with receiving the capability report 210, the network entity 105-*a* may communicate with one or more other cells or network entities 105, such as the network entity 105-*b*, to coordinate the usage of out-of-band pilots for the IQ imbalance measurement at the UE 115-*a* (such as for FDRSB estimation at the UE 115-*a*). For example, the network entity 105-*a* may transmit a coordination message 215 to the network entity 105-*b* via a communication link 240 (which may be a wired or wireless link). The other cells (such as the network entity 105-*b*) may be communicating in intra-band or inter-band and the network entity 105-*a* may define and signal, via the coordination message 215, a set of parameters associated with a pilot signal 220.

The set of parameters may include a used pattern (such as a used pattern per demodulation reference signal (DMRS) port), a resource allocation of the pilot signal 220, or a quantity of slots or symbols allocated for the transmission of the pilot signal 220. The resource allocation may include one or both of a time domain resource allocation or a frequency domain resource allocation. In examples in which the resource allocation includes a frequency domain resource allocation, the resource allocation of the pilot signal 220 may include or indicate a quantity of RBs in each out-of-band region used by the pilot signal 220, which may be associated with (such as the same as or approximately the same as) the quantity of RBs requested or indicated by the UE 115-*a* to be out-of-band. In some aspects, the network entity 105-*a* may transmit an indication of the set of parameters to the UE 115-*a* to configure the UE 115-*a* to receive the pilot signal 220. The network entity 105-*a* also may indicate, to the UE 115-*a*, a quantity of taps associated with a correction filter at the UE 115-*a*. For example, the network entity 105-*a* may indicate, to the UE 115-*a*, a quantity of taps that the UE 115-*a* may use for the FDRSB correction.

The network entity 105-*a* may transmit the pilot signal 220 to the UE 115-*a* in accordance with the set of parameters and the capability indicated by the UE 115-*a* and the UE 115-*a* may use the pilot signal 220 to measure an IQ imbalance accordingly. For example, the UE 115-*a* may monitor for and receive the pilot signal 220 and may estimate, measure, calculate, select, or otherwise determine an IQ imbalance in accordance with receiving the pilot signal 220. In some scenarios, such an IQ imbalance measurement using the pilot signal 220 (a dedicated pilot signal associated with IQ imbalance measurement and tailored to the capabilities of the UE 115-*a*) may provide a gain of several dBs in terms of an SINR. In other words, dedicated pilots for FDRSB estimation may provide SINR gains of approximately several dBs.

In some implementations, the UE 115-*a* may estimate, measure, calculate, select, or otherwise determine an IQ imbalance per frequency. For example, the UE 115-*a* may expect that an IQ imbalance is potentially different per frequency and, accordingly, may refrain from using a common estimator across multiple frequency bands and may instead largely (such as primarily) use per frequency estimators to measure the IQ imbalance. As such, the UE 115-*a* may use any frequency dependent estimation approach with the pilot signal 220 to estimate, measure, calculate, select, or otherwise determine the IQ imbalance (per frequency).

In accordance with estimating the IQ imbalance using the pilot signal 220, the UE 115-*a* may transmit measurement information 225 to the network entity 105-*a*. In some implementations, the measurement information 225 may include a frequency domain filter response associated with the pilot signal 220. Additionally, or alternatively, the measurement information 225 may include a time domain filter response associated with the pilot signal 220. In implementations in which the measurement information 225 includes the time domain filter response, the UE 115-*a* may select which time domain filter response to report to the network entity 105-*a* in accordance with which time domain filter response is most similar to an estimated, measured, or calculated frequency domain response (according to the quantity of filter taps indicated by the network entity 105-*a*). In other words, the reported time domain filter response may be a response, of multiple different time domain filter responses, that is most similar to a frequency domain filter response associated with the pilot signal, where the time domain filter response being most similar to the frequency domain filter response is associated with (such as depends on) a quantity of taps of a correction filter at the UE 115-*a*.

The network entity 105-*a* may receive the measurement information 225 and may perform an IQ imbalance compensation 230. For example the network entity 105-*a* may compensate for the IQ imbalance that the UE 115-*a* measures using the pilot signal 220 during transmit-side operations associated with a transmission and may transmit a data message 235 to the UE 115-*a* associated with the measurement of the IQ imbalance at the UE 115-*a*, where the transmission of the data message 235 compensates for the measurement of the IQ imbalance. As such, the network entity 105-*a* may compensate for the IQ impairment (instead of or in addition to the UE 115-*a*), as IQ impairment compensation at the UE 115-*a* for relatively high or large bandwidths may generate large power consumption that the UE 115-*a* may be unable or unequipped to handle.

Accordingly, the data message 235 may be pre-compensated for the IQ imbalance such that an actual IQ imbalance (which may still be present and introduced to the signaling associated with the data message 235) impacts the signaling associated with the data message 235 in a manner that preserves the information conveyed by the data message 235. In other words, the UE 115-*a* may be able to successfully decode the data message 235 after any distortion associated with the IQ imbalance is introduced in accordance with the IQ imbalance compensation 230 at the network entity 105-*a*. In accordance with the IQ imbalance compensation 230 being performed at the network entity 105-*a*, the UE 115-*a* may refrain from performing any receiver-side IQ imbalance correction or may still perform receiver-side IQ imbalance correction (such as a reduced IQ imbalance correction).

In some implementations, the UE 115-*a* and the network entity 105-*a* may support iterative FDRSB estimation or iterative IQ imbalance measurement and reporting. In such implementations, for example, the UE 115-*a* may measure any residual or remaining FDRSB or IQ imbalance and may transmit an indication of the residual or remaining FDRSB or IQ imbalance to the network entity 105-*a*. The network entity 105-*a* may perform the IQ imbalance compensation 230 using the residual IQ imbalance and may transmit a second data message in accordance with both the initially reported IQ imbalance and the reported residual IQ imbalance.

In some implementations, the network entity 105-*a* may further transmit a second pilot signal and the UE 115-*a* may measure the second pilot signal to obtain additional measurements of the IQ imbalance at the UE 115-*a*. In such implementations, the UE 115-*a* may transmit an indication of the additional measurements of the IQ imbalance at the UE to the network entity 105-*a* and the network entity 105-*a* may perform the IQ imbalance compensation 230 using the additionally reported measurements (along with the initially reported measurements). The network entity 105-*a* may transmit a second data message associated with both the initially reported IQ imbalance measurements and the additionally reported IQ imbalance measurements, where the transmission of the second data message compensates for both reported IQ imbalance measurements.

Figure 3:
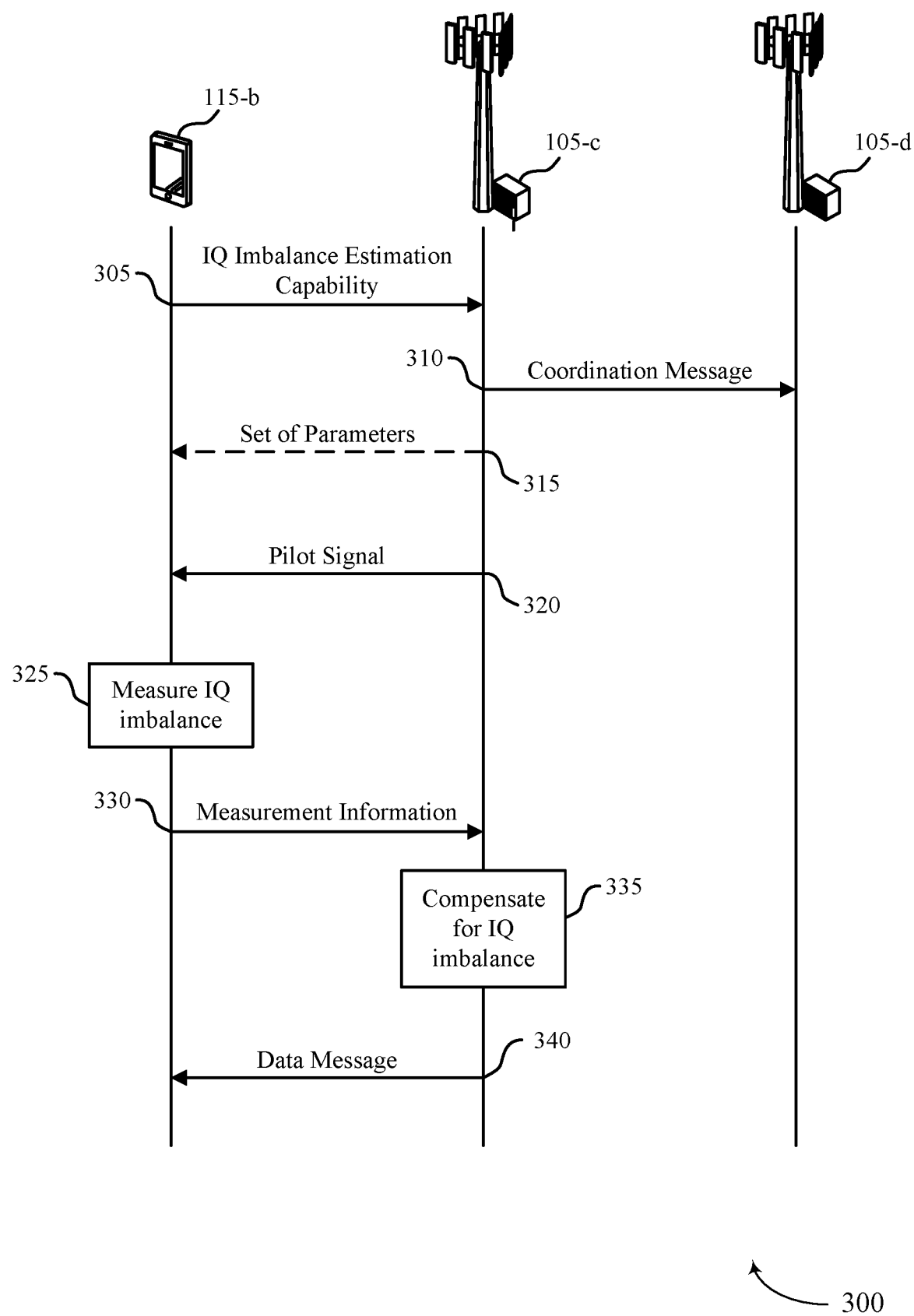
FIG. 3 shows an example process flow that supports dedicated pilot signals associated with radio frequency impairment compensation.

FIG. 3 shows an example process flow 300 that supports dedicated pilot signals associated with radio frequency impairment compensation. The process flow 300 may implement or be implemented to realize aspects of the wireless communications system 100 or the signaling diagram 200. For example, the process flow 300 illustrates communication between a UE 115-*b*, a network entity 105-*c*, and a network entity 105-*d*. The UE 115-*b* may be an example of a UE 115 or a UE 115-*a* as illustrated by and described with reference to FIGS. 1 and 2. The network entity 105-*c* and the network entity 105-*d* may be examples of a network entity 105 or a network entity 105-*a* and a network entity 105-*b*, respectively, as illustrated by and described with reference to FIGS. 1 and 2. In some implementations, the UE 115-*b* and the network entity 105-*c* may support a signaling mechanism according to which the UE 115-*b* may measure and report an IQ imbalance to the network entity 105-*c* for IQ imbalance correction at the network entity 105-*c*.

In the following description of the process flow 300, the operations may be performed (such as reported or provided) in a different order than the order shown, or the operations performed by the example devices may be performed in different orders or at different times. For example, specific operations also may be left out of the process flow 300, or other operations may be added to the process flow 300. Further, although some operations or signaling may be shown to occur at different times for discussion purposes, these operations may actually occur at the same time.

At 305, the UE 115-*b* may transmit, to the network entity 105-*c*, an indication of a capability of the UE 115-*b* associated with measuring an imbalance between an I component and a Q component of a modulated signal. In other words, for example, the UE 115-*b* may transmit an indication of an IQ imbalance estimation or measurement capability. In some aspects, the UE 115-*b* may transmit the indication of the capability to the network entity 105-*c* via a capability report, such as a capability report 210 as illustrated by and described with reference to FIG. 2.

In some implementations, the UE 115-*b* may transmit an indication of an IQ imbalance correction technique (of potentially multiple available IQ imbalance correction techniques) supported by the UE 115-*b*, an indication of a frequency domain resource allocation supported by the UE 115-*b* for a pilot signal to be used for an IQ imbalance measurement, or an indication of whether the UE 115-*b* expects to measure the IQ imbalance, or any combination thereof.

At 310, the network entity 105-*c* may transmit, to the network entity 105-*d* (such as one or more other cells or a neighbor network entity), a coordination message associated with a frequency domain resource allocation (such as an indication of a subcarrier or a quantity of RBs) or a time domain resource allocation (such as a quantity of symbols or slots) associated with the pilot signal to be used for the IQ imbalance measurement. In some implementations, the coordination message may indicate the network entity 105-*d* to avoid a transmission (such as via back-off or re-scheduling) using the frequency domain resource allocation or the time domain resource allocation associated with the pilot signal. For example, the network entity 105-c may indicate the network entity 105-d to not configure or schedule a transmission for a slot N. The network entity 105-c also may indicate various other parameters associated with the pilot signal to the network entity 105-d, as described with reference to FIG. 2. Further, the coordination message as illustrated by and described with reference to FIG. 3 may be an example of a coordination message 215 as illustrated by and described with reference to FIG. 2.

At 315, the UE 115-b may receive, from the network entity 105-c, an indication of a set of parameters associated with the pilot signal in accordance with the capability of the UE 115-b. For example, the network entity 105-c may configure the UE 115-b to measure dedicated IQ pilots for receiver-side IQ imbalance measurement. The set of parameters may include a pattern associated with the pilot signal per DMRS port, an indication of a frequency domain resource allocation (such as a subcarrier or a quantity of RBs, such as a quantity of out-of-band RBs) associated with the pilot signal, or a time domain resource allocation (such as a quantity of slots) associated with the pilot signal, or any combination thereof. In some implementations, the set of parameters may include an indication of a quantity of taps associated with a correction filter at the UE 115-b. In such implementations, the IQ imbalance measurement at the UE 115-b may be associated with (such as depend on) the indicated quantity of taps.

At 320, the UE 115-b may monitor a wireless channel for a pilot signal associated with measuring the IQ imbalance in accordance with the capability of the UE 115-b. For example, the pilot signal may be dedicated for IQ imbalance measurements at the UE 115-b and transmitted, by the network entity 105-c, in accordance with the device- or deployment-specific capability information provided by the UE 115-b. The pilot signal as illustrated by and described with reference to FIG. 3 may be an example of a pilot signal 220 as illustrated by and described with reference to FIG. 2.

At 325, the UE 115-b may measure, calculate, estimate, or otherwise determine the IQ imbalance at the UE 115-b in accordance with receiving the pilot signal. In some implementations, the UE 115-b may generate or otherwise obtain one or both of a frequency domain filter response or a time domain filter response associated with the pilot signal as part of measuring the IQ imbalance at the UE 115-b. In some aspects, the measured IQ imbalance may account for both transmit-side and receive-side sources of IQ imbalance, or may account for one of transmit-side or receive-side sources of IQ imbalance. In other words, the FDRSB that the network entity 105-c corrects may be associated with a transmit-side or a receive-side IQ imbalance, or both.

At 330, the UE 115-b may transmit, to the network entity 105-c, information corresponding to a measurement of the IQ imbalance at the UE 115-b, the measurement of the IQ imbalance being associated with the pilot signal. In some implementations, the measurement information may include an indication of a frequency domain filter response associated with the pilot signal. Additionally, or alternatively, the measurement information may include an indication of a time domain filter response associated with the pilot signal. In implementations in which the UE 115-b reports a time domain filter response, the UE 115-b may select, from multiple time domain filter responses, which time domain filter response to report in accordance with which of the multiple time domain filter responses most closely match (or is otherwise similar within a threshold similarity to, such as within a threshold deviation from) a frequency domain filter response associated with the signal.

At 335, the network entity 105-c may compensate or correct for the IQ imbalance. For example, the network entity 105-c may obtain the measurement information from the UE 115-b associated with the IQ imbalance measurement at the UE 115-b and may use the measurement information to pro-actively or pre-emptively compensate for the IQ imbalance experienced or measured by the UE 115-b. For example, the network entity 105-c may use the measurement information to select, identify, or otherwise determine an impact of the IQ imbalance to received signaling at the UE 115-b and may apply an inverse of the impact to subsequent signaling transmitted to the UE 115-b. As such, an expected impact of the IQ imbalance to such subsequent signaling may maintain an ability of the UE 115-b to successfully decode the signaling without, or with relatively reduced, IQ imbalance compensation at the UE 115-b. In some aspects, such a compensation or correction for the measured IQ imbalance may be referred to as FDRSB correction applied in the network entity-side transmit chain.

At 340, for example, the UE 115-b may receive a data message from the network entity 105-c. The data message (such as the signaling associated with the data message) may be associated with (such as compensated or corrected for) the IQ imbalance measurement at the UE 115-b. For example, a transmission of the data message from the network entity 105-c may compensate for the measurement of the IQ imbalance at the UE 115-b.

Further, although illustrated by the process flow 300 as one iteration, the UE 115-b and the network entity 105-c may iteratively perform such a signaling mechanism such that the UE 115-b may provide IQ imbalance measurement information to the network entity 105-c after an initial compensation attempt, in different channel conditions, periodically, or upon request. Further, the UE 115-b may report any residual FDRSB measurement or IQ imbalance measurement at the UE 115-b after an initial IQ imbalance compensation attempt at the network entity 105-c and, in such implementations, the network entity 105-c may update its IQ imbalance compensation to account for any such residual FDRSB or IQ imbalance measurement. For example, the UE 115-b may signal a residual or remaining IQ imbalance in implementations in which the network entity 105-c configures the UE 115-b for iterative FDRSB estimation. As such, the UE 115-b may refrain from performing a receiver-side IQ imbalance correction technique, or may perform a relatively reduced receiver-side IQ imbalance correction technique, which may reduce power consumption at the UE 115-b and increase a battery life of the UE 115-b. In accordance with such a transmission of pilots out-of-band of a downlink frequency domain allocation and corresponding coordination with neighboring cells to avoid interference, the UE 115-b and the network entity 105-c may obtain more accurate FDRSB estimation at the bandwidth edges, where less processing gain may be available at the UE-side.

Figure 4:
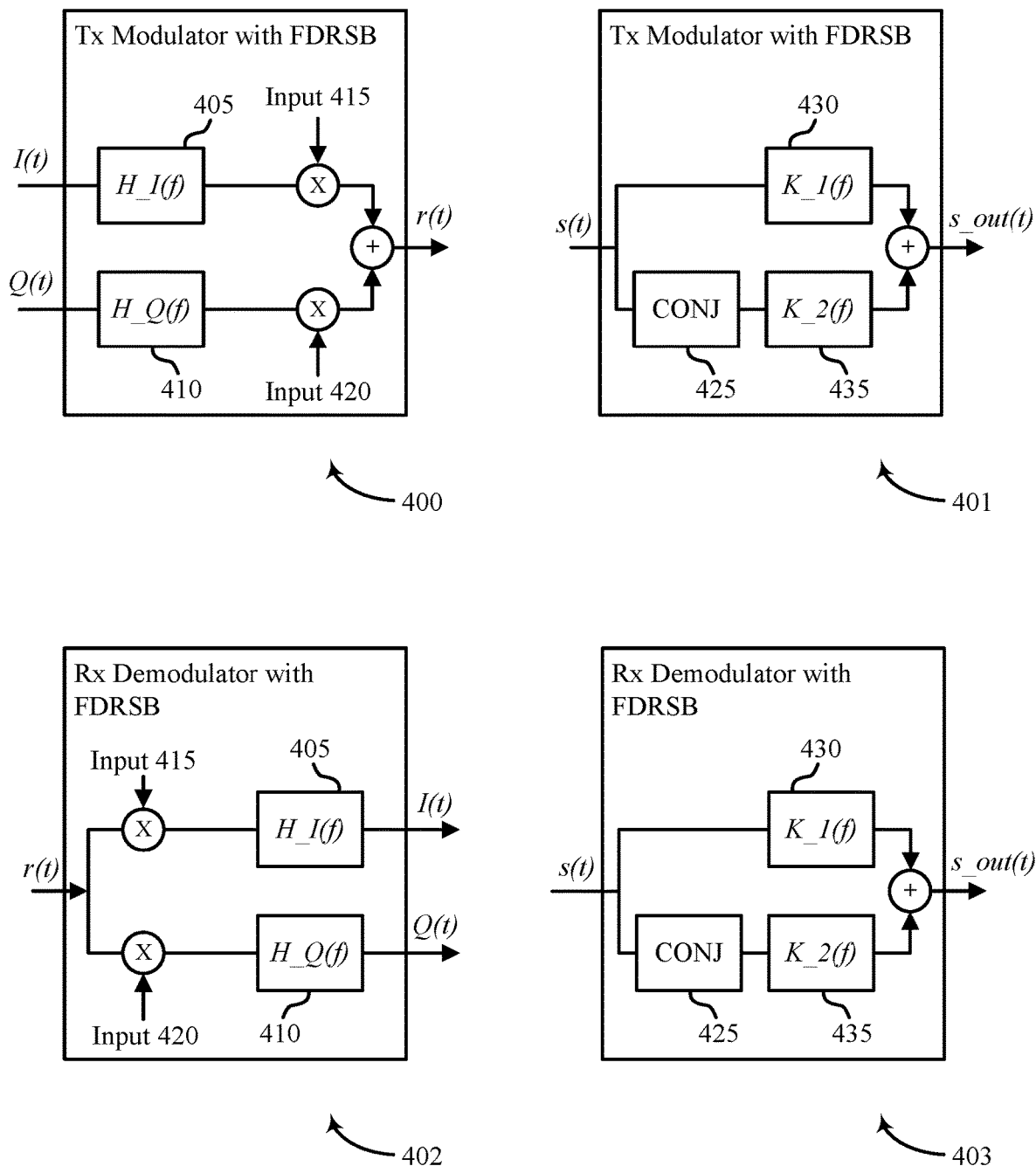
FIGS. 4 and 5 show example signal processing diagrams that support dedicated pilot signals associated with radio frequency impairment compensation.

FIG. 4 shows example signal processing diagrams 400, 401, 402, and 403 that support dedicated pilot signals associated with radio frequency impairment compensation. The signal processing diagrams 400, 401, 402, and 403 may implement or be implemented to realize aspects of the wireless communications system 100, the signaling diagram 200, or the process flow 300. For example, a transmitter and a receiver may implement aspects of one or more of the signal processing diagrams 400, 401, 402, and 403 to transmit or receive, respectively, wireless signaling. A transmitter may be an example of a UE 115 or a network entity 105, as illustrated by and described with reference to FIGS. 1-3. A receiver may be an example of a UE 115 or a network entity 105, as illustrated by and described with reference to FIGS. 1-3. In some aspects, the signal processing diagrams 400, 401, 402, and 403 may be associated with an FDRSB system model involving or associated with a quadrature mixer and may show baseband equivalents of transmission and reception modulators with frequency dependent IQ gain and phase impairment (such as for a 7.5 GHz bandwidth).

For example, at the transmit side, the signal processing diagram 400 may illustrate a transmission modulator with FDRSB and the signal processing diagram 401 may illustrate a baseband equivalent of a transmission modulator with FDRSB. The signal processing diagram 400 illustrates inputs of I(t) and Q(t) (such as an I component of a signal and a Q component of a signal) and may include a filter 405, which may be denoted as $H_I(f)$, and a filter 410, which may be denoted as $H_Q(f)$. The signal processing diagram 400 may include an input 415 and an input 420 to outputs of the filter 405 and the filter 410, respectively. The input 415 may be defined as $\cos(2\pi f_c t + \theta/2)$ and the input 420 may be defined as $-g \cdot \sin(2\pi f_c t - \theta/2)$. The signal processing diagram 400 may include a summation of the two signal paths to obtain a signal r(t), and the frequency dependent IQ imbalance sources may include g, $\theta$, $H_I(f) \neq H_Q(f)$, or an I/Q time skew, or any combination thereof.

The signal processing diagram 401 illustrates an input of s(t), which may be defined as I(t)+jQ(t) and may include signal split into two separate signal paths. One signal path may include a conjugate operation 425 and a filter 435, which may be denoted as $K_1(f)$ and the other signal path may include a filter 430, which may be denoted as $K_2(f)$. The two separate signal paths may be added together to obtain an output of $s_{out}(t)$, which may be defined as $I_{out}(t)+jQ_{out}(t)$. The filter 430 and the filter 435 may be defined in accordance with Equations 1-4, shown below. As shown below, Equation 1 and Equation 3 illustrate the filter 430 and the filter 435, respectively, as FDRSB filters and Equation 2 and Equation 4 illustrate the filter 430 and the filter 435, respectively, as baseband equivalent (up to phase or gain) FDRSB filters.

$$K_1(f) = \frac{1}{2}e^{j\frac{\theta}{2}}[H_I(f) + ge^{-j\theta}H_Q(f)] \quad (1)$$

$$K_1(f) = H_I(f) + ge^{-j\theta}H_Q(f) \quad (2)$$

$$K_2(f) = \frac{1}{2}e^{j\frac{\theta}{2}}[H_I(f) - ge^{-j\theta}H_Q(f)] \quad (3)$$

$$K_2(f) = H_I(f) - ge^{-j\theta}H_Q(f) \quad (4)$$

At the receiver side, the signal processing diagram 402 may illustrate a reception demodulator with FDRSB and the signal processing diagram 403 may illustrate a baseband equivalent of a reception demodulator with FDRSB. As illustrated in the signal processing diagram 402, an input $r(t)=\text{Re}\{s(t)e^{j2\pi f_c t}\}$ may be obtained (such as via OTA signaling). The receiver may split the input r(t) into two separate signal paths may apply the input 415 and the filter 405 to one path and may apply the input 420 and the filter 410 to the other. The signal processing diagram 402 may output $I_{out}(t)$ from the signal path associated with the input 415 and the filter 405 and may output $Q_{out}(t)$ from the signal path associated with the input 420 and the filter 410. With similarity to the transmitter side, frequency dependent IQ imbalance sources may include g, $\theta$, $H_I(f) \neq H_Q(f)$, or an I/Q time skew, or any combination thereof.

The signal processing diagram 403 illustrates an input s(t) and a split of the input signal s(t) into two separate signal paths. One signal path may be associated with the filter 430 and the other signal path may be associated with the conjugate operation 425 and the filter 435. The signal processing diagram 403 illustrates a summation of the two signal paths to obtain an output of $s_{out}(t)$, which may be defined as $I_{out}+jQ_{out}(t)$.

Figure 5:
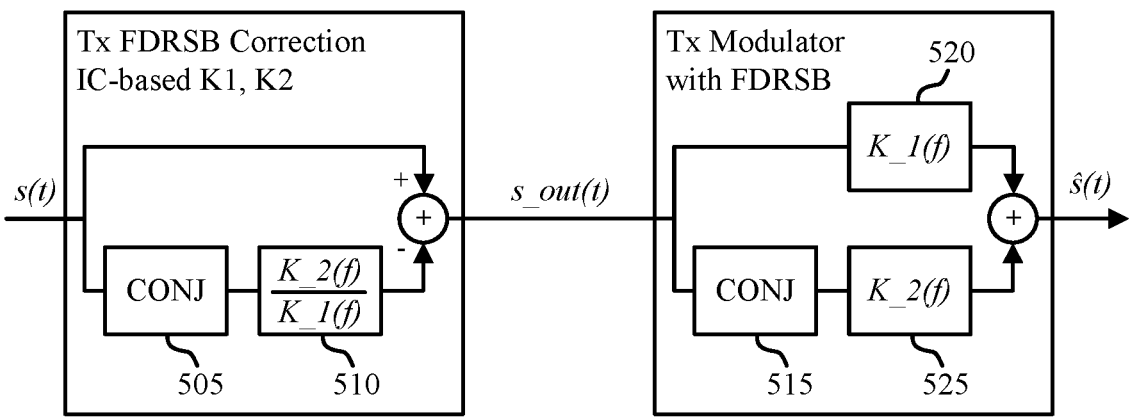
Figure 5:
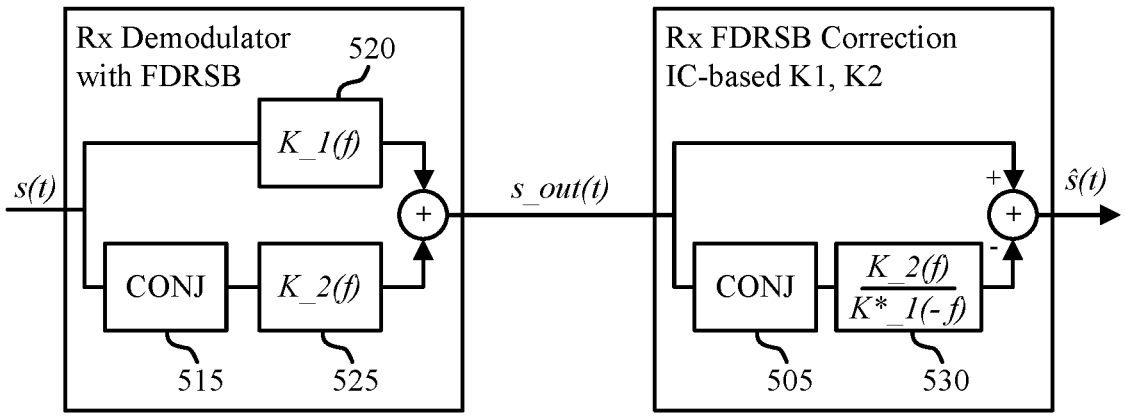

FIG. 5 shows example signal processing diagrams 500 and 501 that support dedicated pilot signals associated with radio frequency impairment compensation. The signal processing diagrams 500 and 501 may implement or be implemented to realize aspects of the wireless communications system 100, the signaling diagram 200, the process flow 300, or any one or more of the signal processing diagrams 400, 401, 402, and 403. For example, a transmitter and a receiver may implement aspects of one or more of the signal processing diagrams 500 or 501 to transmit or receive, respectively, wireless signaling. A transmitter may be an example of a UE 115 or a network entity 105, as illustrated by and described with reference to FIGS. 1-3. A receiver may be an example of a UE 115 or a network entity 105, as illustrated by and described with reference to FIGS. 1-3. In some aspects, the signal processing diagrams 500 and 501 may illustrate examples of an FDRSB interference canceller based on an estimation, calculation, selection, or determination of a ratio of $K_2(f)/K_1(f)$ (such as for a 7.5 GHz bandwidth).

In the example of the signal processing diagram 500, which may be an example of a transmit chain, a first part or component may be associated with a transmission FDRSB correction interference canceller associated with $K_1(f)$ and $K_2(f)$ and a second part or component may be an example of a transmission modulator with FDRSB (such as a transmission modulator with FDRSB as illustrated by and described with reference to FIG. 4). The interference canceller may take an input s(t) may split the input into separate signal paths, where a first signal path may be associated with a conjugate operation 505 and a filter 510, which may be defined as $K_2(f)/K_1(f)$, and a second signal path may lack any operations or filters. The interference canceller may sum a positive version of the second signal path with a negative version of the first signal path to obtain an output $s_{out}(t)$, which may be defined as $I_{out}(t)+jQ_{out}(t)$.

The transmission modulator with FDRSB may use the $s_{out}(t)$ as an input and may split the input into two separate signal paths, including a first signal path associated with a conjugate operation 515 (which, mathematically, may be the same as the conjugate operation 505) and a filter 525, and a second signal path associated with a filter 520. The filter 520 may be denoted as $K_1(f)$ and the filter 525 may be denoted as $K_2(f)$. The transmission modulator with FDRSB may sum the two signal paths to obtain an output $\hat{s}(t)$. $\hat{s}(t)$ may be further defined with FDRSB removed in accordance with Equation 5, shown below.

$$\hat{s}(t) \xrightarrow{F} \hat{S}(f) = \left(K_1(f) - \frac{K_2(f)K_2^*(-f)}{K_1^*(-f)}\right) \cdot S(f) \quad (5)$$

In the example of the signal processing diagram 501, which may be an example of a receive chain, a first part or component may be a reception demodulator with FDRSB and a second part or component may be a reception FDRSB correction interference canceller associated with $K_1(f)$ and $K_2(f)$. The reception demodulator may obtain an input s(t) and may split the input into two separate signal paths, including a first signal path associated with the conjugate operation 515 and the filter 525 and a second signal path associated with the filter 520. The reception demodulator may sum the two signal paths and output $s_{out}(t)$, which may be defined as $I_{out}(t)+jQ_{out}(t)$.

The interference canceller may obtain $s_{out}(t)$ as an input and may split the input into two separate signal paths, including a first signal path associated with the conjugate operation 505 and a filter 530, which may be defined as $K_2(f)/K_1^*(-f)$, and a second signal path associated with a lack of operations or filters. The interference canceller may perform a summation of a positive version of the second signal path and a negative version of the first signal path to obtain an output ŝ(t). In some aspects, ŝ(t) may be further defined with FDRSB removed in accordance with Equation 5, shown above.

To obtain FDRSB estimation and calculation (such as simultaneous transmit-side and receive-side FDRSB calibration), a device (such as a UE 115 or a network entity 105) may build or generate an equation in accordance with a set of measurements (such as three measurements). Such an equation may be defined in accordance with Equation 6, shown below, for a phase shifter $C(f) \cong e^{j\varphi_1}$.

$$\text{Meas}_2^{(\varphi_1)} = K_{2r} \cdot \text{Meas}_3^{(\varphi_1)} + K_{2r} \cdot \text{Meas}_1^{(\varphi_1)*} \tag{6}$$

The measurements that the device may obtain may be associated with a reception modulator output $S_{Rx}(f)$, which may be defined in accordance with Equation 7, shown below.

$$S_{Rx}(f) = S_{PS}(f) + K_{2r}(f) S_{PS}^*(-f) \tag{7}$$

A first measurement, such as $\text{Meas}_1^{(\varphi_1)}$, may be associated with a value of $S_{Rx}(f)$ for $f=f_0$, which may be associated with a ToneVec[$k_0$] and $C(f_0) \cdot \delta(f-f_0)$, where $K_{2r}(f_0)K_{2r}^*(-f_0) \cong 0$. A second measurement, such as $\text{Meas}_2^{(\varphi_1)}$, may be associated with a value of $S_{Rx}(f)$ for $f=-f_0$, which may be associated with a MirrorVec[$-k_0$] and $(K_{2r} \cdot C(-f_0)+K_{2r} C^*(f_0)) \cdot \delta(f+f_0)$. A third measurement, such as $\text{Meas}_3^{(\varphi_1)}$, may be associated with a repeat measurement with a transmission tone at $-f_0$. For example, the third measurement may be associated with a ToneVec[$-k_0$] and $C(-f_0) \cdot \delta(f+f_0)$, where $S(f) = \delta(f+f_0)$.

The device may repeat Equation 6 with the phase shifter $C(f)$ shifted to a different phase offset, such as for $C(f) \cong e^{j\varphi_2}$, and obtain another equation, such as Equation 8, shown below.

$$\text{Meas}_2^{(\varphi_2)} = K_{2r} \cdot \text{Meas}_3^{(\varphi_2)} + K_{2r} \tag{8}$$

The device may obtain a relatively small or minimal noise boost if $|\varphi_1 - \varphi_2| = \pi/2$. The device may repeat for other frequencies $f_0$ to obtain a frequency response of the FDRSB correction filters $\hat{K}_{2r}(f)$ and $\hat{K}_{2r}(f)$. For example, the device may solve Equation 9, shown below (such as the two equations associated with Equation 9) with two variables for a set of subcarriers (such as for all relevant subcarriers).

$$\begin{bmatrix} ToneVec^{(\varphi_1)}[-k_0] & ToneVec^{(\varphi_1)*}[k_0] \\ ToneVec^{(\varphi_2)}[-k_0] & ToneVec^{(\varphi_2)*}[k_0] \end{bmatrix} \begin{bmatrix} \hat{K}_{2r}[-k_0]/\hat{K}_{1r}[-k_0] \\ \hat{K}_{2r}[-k_0]/\hat{K}_{1r}^*[+k_0] \end{bmatrix} = \begin{bmatrix} MirrorVec^{(\varphi_1)}[-k_0] \\ MirrorVec^{(\varphi_2)}[-k_0] \end{bmatrix} \tag{9}$$

Accordingly, for a transmit-side IQ correction, the device may transmit positive tones $S(f)=\delta(f-f_0)$ and may transmit negative tones $S(f)=\delta(f+f_0)$. The resulting $S_{Tx}(f)$ values for the positive tones may be defined in accordance with Equation 10 and associated with a first measurement and a second measurement and the resulting $S_{Tx}(f)$ values for the negative tones may be defined in accordance with Equation 11 and associated with a third measurement and a fourth measurement, as shown below. H may be a common channel and a training signal (such as a spectral plot associated with the training signal) may be illustrated by a series of values across a range of $k_0 = -k_{max} \ldots k_{max}$.

$$S_{Tx}(f) = \underbrace{\delta(f-f_0)K_{1T}(f_0)H(f_0)}_{meas1} + \underbrace{\delta(f+f_0)K_{2T}(f_0)H(-f_0)}_{meas2} \tag{10}$$

$$S_{Tx}(f) = \underbrace{\delta(f+f_0)K_{1T}(-f_0)H(-f_0)}_{meas3} + \underbrace{\delta(f-f_0)K_{2T}(f_0)H(f_0)}_{meas4} \tag{11}$$

Thus, the device may solve for the correction filters in accordance with Equations 12 and 13, shown below.

$$\frac{k_{2T}(-f_0)}{K_{1T}(-f_0)} = \frac{meas2}{meas3} \tag{12}$$

$$\frac{k_{2T}(f_0)}{K_{1T}(f_0)} = \frac{meas1}{meas4} \tag{13}$$

Figure 6:
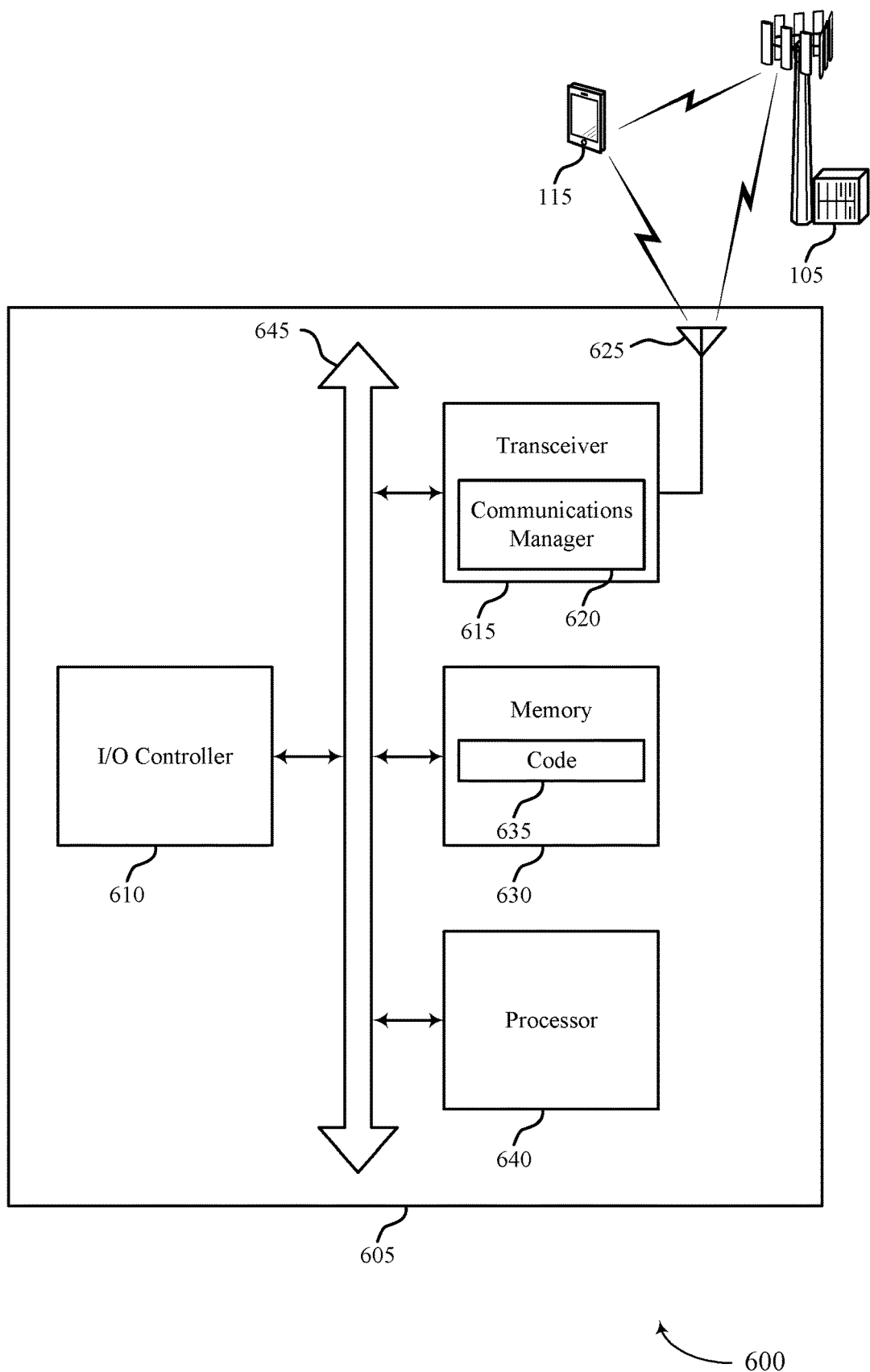
FIGS. 6 and 7 show block diagrams of example devices that support dedicated pilot signals associated with radio frequency impairment compensation.

FIG. 6 shows a block diagram 600 of an example device 605 that supports dedicated pilot signals associated with radio frequency impairment compensation. The device 605 may communicate (such as wirelessly) with one or more network entities (such as one or more components of one or more network entities 105), one or more UEs 115, or any combination thereof. The device 605 may include components for bi-directional voice and data communications including components for transmitting and receiving communications, such as a communications manager 620, an input/output (I/O) controller 610, a transceiver 615, an antenna 625, a memory 630, code 635, and a processor 640. These components may be in electronic communication or otherwise coupled (such as operatively, communicatively, functionally, electronically, electrically) via one or more buses (such as a bus 645).

The I/O controller 610 may manage input and output signals for the device 605. The I/O controller 610 also may manage peripherals not integrated into the device 605. In some implementations, the I/O controller 610 may represent a physical connection or port to an external peripheral. In some implementations, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some implementations, the I/O controller 610 may be implemented as part of a processor or processing system, such as the processor 640. In some implementations, a user may interact with the device 605 via the I/O controller 610 or via hardware components controlled by the I/O controller 610.

In some implementations, the device 605 may include a single antenna 625. However, in some other implementations, the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625.

In some implementations, the transceiver 615 may include one or more interfaces, such as one or more interfaces coupled with the one or more antennas 625 that are configured to support various receiving or obtaining operations, or one or more interfaces coupled with the one or more antennas 625 that are configured to support various transmitting or outputting operations, or a combination thereof. In some implementations, the transceiver 615 may include or be configured for coupling with one or more processors or memory components that are operable to perform or support operations based on received or obtained information or signals, or to generate information or other signals for transmission or other outputting, or any combination thereof. In some implementations, the transceiver 615, or the transceiver 615 and the one or more antennas 625, or the transceiver 615 and the one or more antennas 625 and one or more processors or memory components (such as the processor 640, or the memory 630, or both), may be included in a chip or chip assembly that is installed in the device 605.

The memory 630 may include random access memory (RAM) and read-only memory (ROM). The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some implementations, the code 635 may not be directly executable by the processor 640 but may cause a computer (such as when compiled and executed) to perform functions described herein. In some implementations, the memory 630 may contain, among other things, a basic I/O system (BIOS) which may control basic hardware or software operation such as the interaction with peripheral components or devices.

The processor 640 may be any one or more suitable processors capable of executing scripts or instructions of one or more software programs stored in the device 605 (such as within the memory 630). In some implementations, the processor 640 may be a component of a processing system. A processing system may generally refer to a system or series of machines or components that receives inputs and processes the inputs to produce a set of outputs (which may be passed to other systems or components of, for example, the device 605). For example, a processing system of the device 605 may refer to a system including the various other components or subcomponents of the device 605, such as the processor 640, or the transceiver 615, or the communications manager 620, or other components or combinations of components of the device 605.

The processing system of the device 605 may interface with other components of the device 605, and may process information received from other components (such as inputs or signals) or output information to other components. For example, a chip or modem of the device 605 may include a processing system and an interface to output information, or to obtain information, or both. The interface may be implemented as or otherwise include one or more interfaces, such as a first interface configured to output information and a second interface configured to obtain information. In some implementations, the first interface may refer to an interface between the processing system of the chip or modem and a transmitter, such that the device 605 may transmit information output from the chip or modem. In some implementations, the second interface may refer to an interface between the processing system of the chip or modem and a receiver, such that the device 605 may obtain information or signal inputs, and the information may be passed to the processing system. A person having ordinary skill in the art will readily recognize that the first interface also may obtain information or signal inputs, and the second interface also may output information or signal outputs.

The communications manager 620 may support wireless communication at a UE in accordance with implementations as disclosed herein. For example, the communications manager 620 may be configured as or otherwise support a means for transmitting an indication of a capability of the UE associated with measuring an imbalance between an in-phase component and a quadrature component of a modulated signal. The communications manager 620 may be configured as or otherwise support a means for monitoring a wireless channel for a pilot signal associated with measuring the imbalance in accordance with the capability of the UE. The communications manager 620 may be configured as or otherwise support a means for transmitting information corresponding to a measurement of the imbalance at the UE, where the measurement of the imbalance is associated with the pilot signal.

In some implementations, the communications manager 620 may be configured as or otherwise support a means for receiving an indication of a set of parameters associated with the pilot signal in accordance with the capability of the UE, where receiving the pilot signal is associated with the set of parameters.

In some implementations, a pattern associated with the pilot signal per demodulation reference signal port, an indication of a frequency domain resource allocation associated with the pilot signal, or a quantity of slots associated with the pilot signal, or any combination thereof.

In some implementations, the set of parameters includes a quantity of taps associated with a correction filter at the UE. In some implementations, the measurement of the imbalance at the UE is further associated with the quantity of taps.

In some implementations, to support transmitting the indication of the capability of the UE, the communications manager 620 may be configured as or otherwise support a means for transmitting an indication of an in-phase and quadrature imbalance correction technique supported by the UE, an indication of a frequency domain resource allocation supported by the UE for the pilot signal, or an indication of whether the UE expects to measure the imbalance between the in-phase component and the quadrature component of the modulated signal, or any combination thereof.

In some implementations, to support transmitting the information corresponding to the measurement of the imbalance at the UE, the communications manager 620 may be configured as or otherwise support a means for transmitting an indication of a frequency domain filter response associated with the pilot signal.

In some implementations, to support transmitting the information corresponding to the measurement of the imbalance at the UE, the communications manager 620 may be configured as or otherwise support a means for transmitting an indication of a time domain filter response associated with the pilot signal.

In some implementations, the time domain filter response is a response, of a set of multiple time domain filter responses, that is most similar to a frequency domain filter response associated with the pilot signal. In some implementations, the time domain filter response being the most similar to the frequency domain filter response is associated with a quantity of taps of a correction filter at the UE.

In some implementations, the communications manager 620 may be configured as or otherwise support a means for receiving a data message associated with the measurement of the imbalance at the UE, where transmission of the data message compensates for the measurement of the imbalance at the UE.

In some implementations, the communications manager 620 may be configured as or otherwise support a means for monitoring the wireless channel for a second pilot signal associated with measuring the imbalance in accordance with the capability of the UE. In some implementations, the communications manager 620 may be configured as or otherwise support a means for transmitting second information associated with a second measurement of the imbalance between the in-phase component and the quadrature component of the modulated signal at the UE, where the second measurement of the imbalance at the UE is associated with the second pilot signal. In some implementations, the communications manager 620 may be configured as or otherwise support a means for receiving a data message associated with both the measurement of the imbalance at the UE and the second measurement of the imbalance at the UE, where transmission of the data message compensates for the measurement of the imbalance at the UE and the second measurement of the imbalance at the UE.

In some implementations, the measurement of the imbalance at the UE is associated with an FDRSB estimation at the UE.

In some implementations, the communications manager 620 may be configured to perform various operations (such as receiving, monitoring, transmitting) using or otherwise in cooperation with the transceiver 615, the one or more antennas 625, or any combination thereof. Although the communications manager 620 is illustrated as a separate component, in some implementations, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of dedicated pilot signals associated with radio frequency impairment compensation as described herein, or the processor 640 and the memory 630 may be otherwise configured to perform or support such operations.

Figure 7:
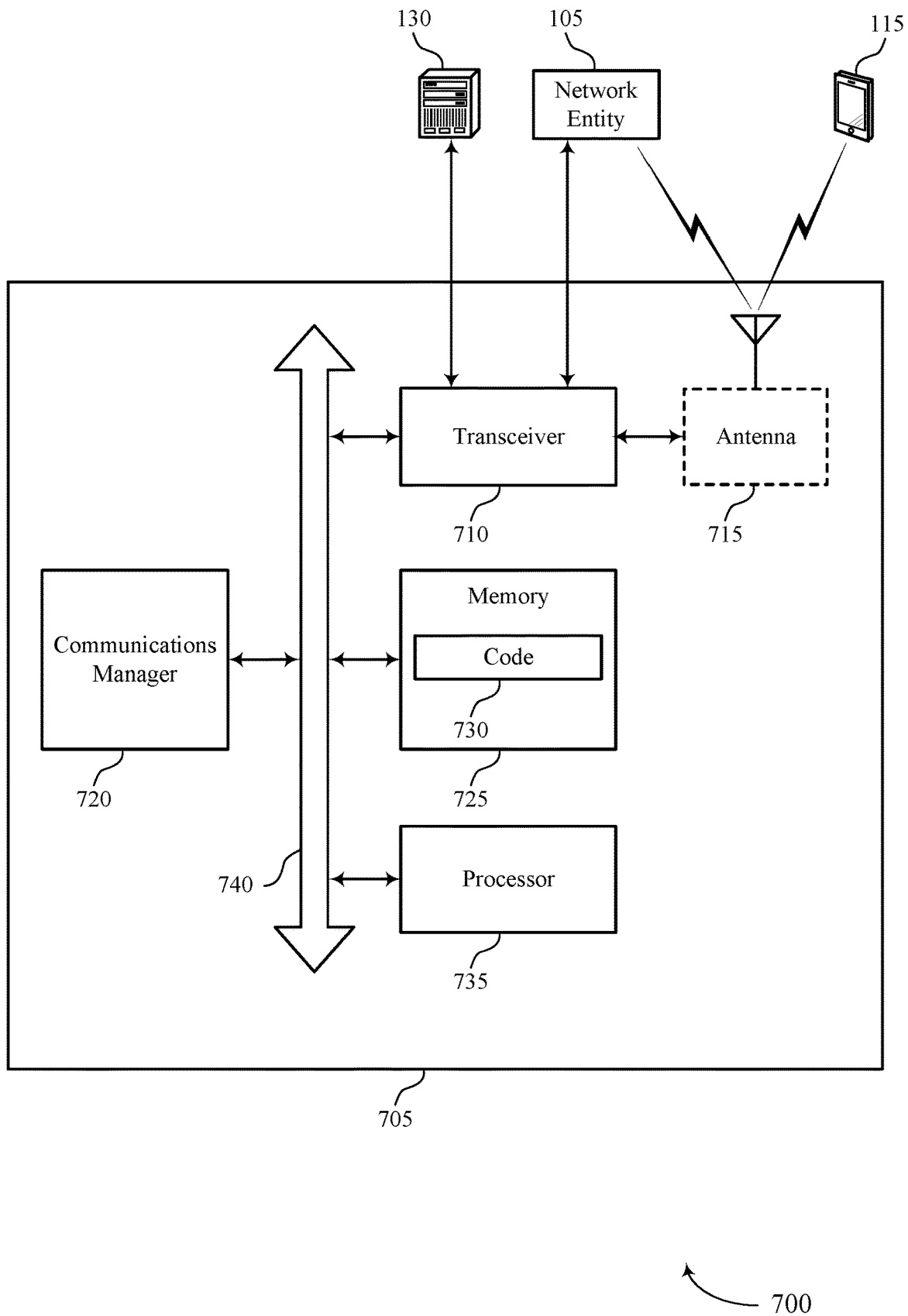

FIG. 7 shows a block diagram 700 of an example device 705 that supports dedicated pilot signals associated with radio frequency impairment compensation. The device 705 may communicate with one or more network entities (such as one or more components of one or more BSs 105), one or more UEs 115, or any combination thereof, which may include communications over one or more wired interfaces, over one or more wireless interfaces, or any combination thereof. The device 705 may include components that support outputting and obtaining communications, such as a communications manager 720, a transceiver 710, an antenna 715, a memory 725, code 730, and a processor 735. These components may be in electronic communication or otherwise coupled (such as operatively, communicatively, functionally, electronically, electrically) via one or more buses (such as a bus 740).

The transceiver 710 may support bi-directional communications via wired links, wireless links, or both as described herein. In some implementations, the transceiver 710 may include a wired transceiver and may communicate bi-directionally with another wired transceiver. Additionally, or alternatively, in some implementations, the transceiver 710 may include a wireless transceiver and may communicate bi-directionally with another wireless transceiver. In some implementations, the device 705 may include one or more antennas 715, which may be capable of transmitting or receiving wireless transmissions (such as concurrently). The transceiver 710 also may include a modem to modulate signals, to provide the modulated signals for transmission (such as by one or more antennas 715, by a wired transmitter), to receive modulated signals (such as from one or more antennas 715, from a wired receiver), and to demodulate signals.

In some implementations, the transceiver 710 may include one or more interfaces, such as one or more interfaces coupled with the one or more antennas 715 that are configured to support various receiving or obtaining operations, or one or more interfaces coupled with the one or more antennas 715 that are configured to support various transmitting or outputting operations, or a combination thereof. In some implementations, the transceiver 710 may include or be configured for coupling with one or more processors or memory components that are operable to perform or support operations based on received or obtained information or signals, or to generate information or other signals for transmission or other outputting, or any combination thereof. In some implementations, the transceiver 710, or the transceiver 710 and the one or more antennas 715, or the transceiver 710 and the one or more antennas 715 and one or more processors or memory components (such as the processor 735, or the memory 725, or both), may be included in a chip or chip assembly that is installed in the device 705. In some implementations, the transceiver may be operable to support communications via one or more communications links (such as a communication link 125, a backhaul communication link 120, a midhaul communication link 162, a fronthaul communication link 168).

The memory 725 may include RAM and ROM. The memory 725 may store computer-readable, computer-executable code 730 including instructions that, when executed by the processor 735, cause the device 705 to perform various functions described herein. The code 730 may be stored in a non-transitory computer-readable medium such as system memory or another type of memory. In some implementations, the code 730 may not be directly executable by the processor 735 but may cause a computer (such as when compiled and executed) to perform functions described herein. In some implementations, the memory 725 may contain, among other things, a BIOS which may control basic hardware or software operation such as the interaction with peripheral components or devices.

The processor 735 may include an intelligent hardware device (such as a general-purpose processor, a DSP, an ASIC, a CPU, an FPGA, a microcontroller, a programmable logic device, discrete gate or transistor logic, a discrete hardware component, or any combination thereof). In some implementations, the processor 735 may be configured to operate a memory array using a memory controller. In some other implementations, a memory controller may be integrated into the processor 735. The processor 735 may be configured to execute computer-readable instructions stored in a memory (such as the memory 725) to cause the device 705 to perform various functions (such as functions or tasks supporting dedicated pilot signals associated with radio frequency impairment compensation). For example, the device 705 or a component of the device 705 may include a processor 735 and memory 725 coupled with the processor 735, the processor 735 and memory 725 configured to perform various functions described herein. The processor 735 may be an example of a cloud-computing platform (such as one or more physical nodes and supporting software such as operating systems, virtual machines, or container instances) that may host the functions (such as by executing code 730) to perform the functions of the device 705. The processor 735 may be any one or more suitable processors capable of executing scripts or instructions of one or more software programs stored in the device 705 (such as within the memory 725).

In some implementations, the processor 735 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or sub-components of the device 705, such as the processor 735, or the transceiver 710, or the communications manager 720, or other components or combinations of components of the device 705. The processing system of the device 705 may interface with other components of the device 705, and may process information received from other components (such as inputs or signals) or output information to other components. For example, a chip or modem of the device 705 may include a processing system and an interface to output information, or to obtain information, or both. The interface may be implemented as or otherwise include one or more interfaces, such as a first interface configured to output information and a second interface configured to obtain information. In some implementations, the first interface may refer to an interface between the processing system of the chip or modem and a transmitter, such that the device 705 may transmit information output from the chip or modem. In some implementations, the second interface may refer to an interface between the processing system of the chip or modem and a receiver, such that the device 705 may obtain information or signal inputs, and the information may be passed to the processing system. A person having ordinary skill in the art will readily recognize that the first interface also may obtain information or signal inputs, and the second interface also may output information or signal outputs.

In some implementations, a bus 740 may support communications of (such as within) a protocol layer of a protocol stack. In some implementations, a bus 740 may support communications associated with a logical channel of a protocol stack (such as between protocol layers of a protocol stack), which may include communications performed within a component of the device 705, or between different components of the device 705 that may be co-located or located in different locations (such as where the device 705 may refer to a system in which one or more of the communications manager 720, the transceiver 710, the memory 725, the code 730, and the processor 735 may be located in one of the different components or divided between different components).

In some implementations, the communications manager 720 may manage aspects of communications with a core network 130 (such as via one or more wired or wireless backhaul links). For example, the communications manager 720 may manage the transfer of data communications for client devices, such as one or more UEs 115. In some implementations, the communications manager 720 may manage communications with other network entities 105, and may include a controller or scheduler for controlling communications with UEs 115 in cooperation with other network entities 105. In some implementations, the communications manager 720 may support an X2 interface within an LTE/LTE-A wireless communications network technology to provide communication between network entities 105.

The communications manager 720 may support wireless communication at a network entity in accordance with implementations as disclosed herein. For example, the communications manager 720 may be configured as or otherwise support a means for receiving an indication of a capability of a UE associated with measuring an imbalance between an in-phase component and a quadrature component of a modulated signal. The communications manager 720 may be configured as or otherwise support a means for transmitting a pilot signal associated with measuring the imbalance in accordance with the capability of the UE. The communications manager 720 may be configured as or otherwise support a means for receiving information corresponding to a measurement of the imbalance at the UE, where the measurement of the imbalance is associated with the pilot signal.

In some implementations, the communications manager 720 may be configured as or otherwise support a means for transmitting an indication of a set of parameters associated with the pilot signal in accordance with the capability of the UE, where transmitting the pilot signal is associated with the set of parameters.

In some implementations, a pattern associated with the pilot signal per demodulation reference signal port, an indication of a frequency domain resource allocation associated with the pilot signal, or a quantity of slots associated with the pilot signal, or any combination thereof.

In some implementations, the set of parameters includes a quantity of taps associated with a correction filter at the UE. In some implementations, the measurement of the imbalance at the UE is further associated with the quantity of taps.

In some implementations, to support receiving the indication of the capability of the UE, the communications manager 720 may be configured as or otherwise support a means for receiving an indication of an in-phase and quadrature imbalance correction technique supported by the UE, an indication of a frequency domain resource allocation supported by the UE for the pilot signal, or an indication of whether the UE expects to measure the imbalance between the in-phase component and the quadrature component of the modulated signal, or any combination thereof.

In some implementations, to support receiving the information corresponding to the measurement of the imbalance at the UE, the communications manager 720 may be configured as or otherwise support a means for receiving an indication of a frequency domain filter response associated with the pilot signal.

In some implementations, to support receiving the information corresponding to the measurement of the imbalance at the UE, the communications manager 720 may be configured as or otherwise support a means for receiving an indication of a time domain filter response associated with the pilot signal.

In some implementations, the time domain filter response is a response, of a set of multiple time domain filter responses, that is most similar to a frequency domain filter response associated with the pilot signal. In some implementations, the time domain filter response being the most similar to the frequency domain filter response is associated with a quantity of taps of a correction filter at the UE.

In some implementations, the communications manager 720 may be configured as or otherwise support a means for transmitting a data message associated with the measurement of the imbalance at the UE, where transmission of the data message compensates for the measurement of the imbalance at the UE.

In some implementations, the communications manager 720 may be configured as or otherwise support a means for transmitting a second pilot signal associated with measuring the imbalance in accordance with the capability of the UE. In some implementations, the communications manager 720 may be configured as or otherwise support a means for receiving second information associated with a second measurement of the imbalance between the in-phase component and the quadrature component of the modulated signal at the UE, where the second measurement of the imbalance at the UE is associated with the second pilot signal. In some implementations, the communications manager 720 may be configured as or otherwise support a means for transmitting a data message associated with both the measurement of the imbalance at the UE and the second measurement of the imbalance at the UE, where the data message compensates for the measurement of the imbalance at the UE and the second measurement of the imbalance at the UE.

In some implementations, the communications manager 720 may be configured as or otherwise support a means for transmitting, to a second network entity, a coordination message associated with a frequency domain resource allocation or a slot associated with the pilot signal, where the coordination message indicates the second network entity to avoid a transmission using the frequency domain resource allocation or the slot associated with the pilot signal.

In some implementations, the measurement of the imbalance at the UE is associated with an FDRSB estimation at the UE.

In some implementations, the communications manager 720 may be configured to perform various operations (such as receiving, obtaining, monitoring, outputting, transmitting) using or otherwise in cooperation with the transceiver 710, the one or more antennas 715 (such as where applicable), or any combination thereof. Although the communications manager 720 is illustrated as a separate component, in some implementations, one or more functions described with reference to the communications manager 720 may be supported by or performed by the processor 735, the memory 725, the code 730, the transceiver 710, or any combination thereof. For example, the code 730 may include instructions executable by the processor 735 to cause the device 705 to perform various aspects of dedicated pilot signals associated with radio frequency impairment compensation as described herein, or the processor 735 and the memory 725 may be otherwise configured to perform or support such operations.

Figure 8:
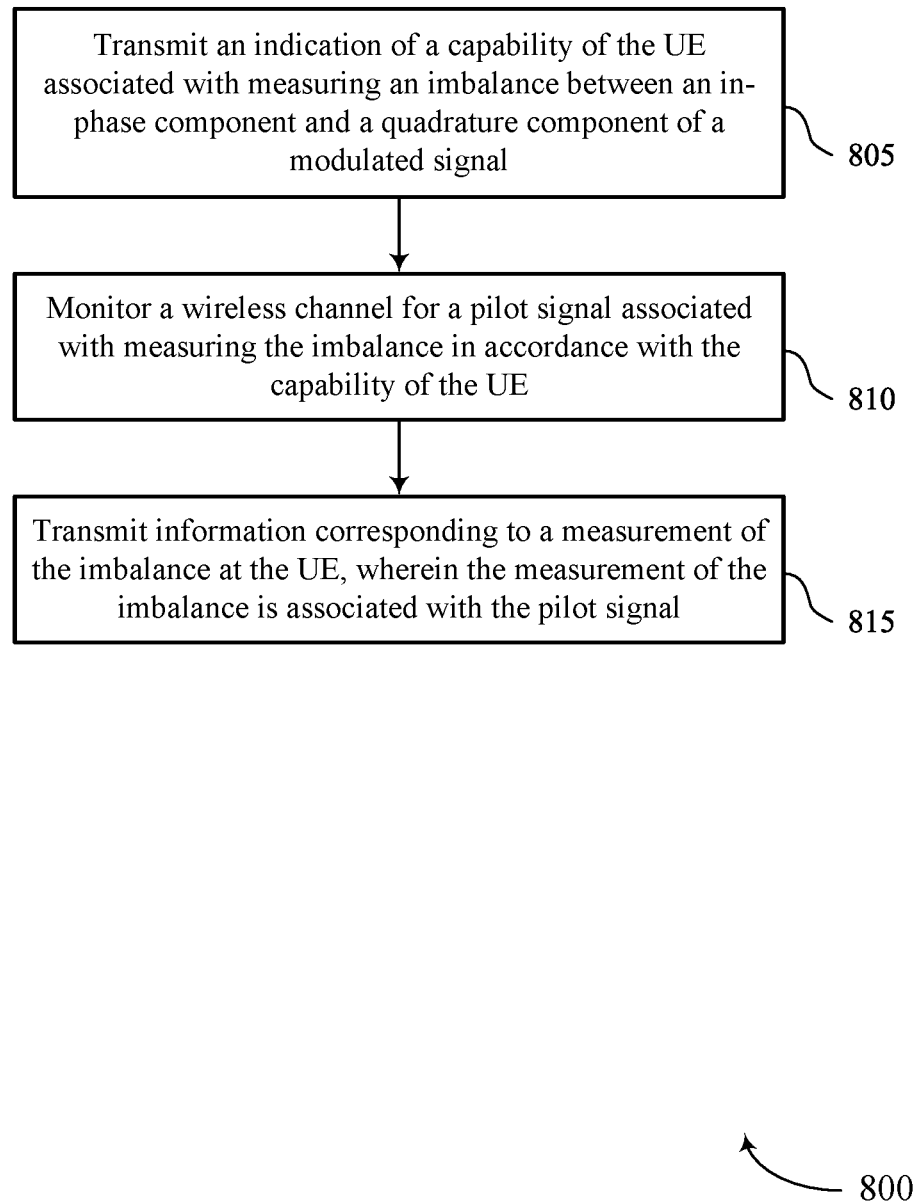
FIGS. 8 and 9 show flowcharts illustrating example methods that support dedicated pilot signals associated with radio frequency impairment compensation.

FIG. 8 shows a flowchart illustrating an example method 800 that supports dedicated pilot signals associated with radio frequency impairment compensation. The operations of the method 800 may be implemented by a UE or its components as described herein. For example, the operations of the method 800 may be performed by a UE 115 as described with reference to FIGS. 1-6. In some implementations, a UE may execute a set of instructions to control the functional elements of the UE to perform the described functions. Additionally, or alternatively, the UE may perform aspects of the described functions using special-purpose hardware.

At 805, the method may include transmitting an indication of a capability of the UE associated with measuring an imbalance between an in-phase component and a quadrature component of a modulated signal. The operations of 805 may be performed in accordance with implementations as disclosed herein.

At 810, the method may include monitoring a wireless channel for a pilot signal associated with measuring the imbalance in accordance with the capability of the UE. The operations of 810 may be performed in accordance with implementations as disclosed herein.

At 815, the method may include transmitting information corresponding to a measurement of the imbalance at the UE, where the measurement of the imbalance is associated with the pilot signal. The operations of 815 may be performed in accordance with implementations as disclosed herein.

Figure 9:
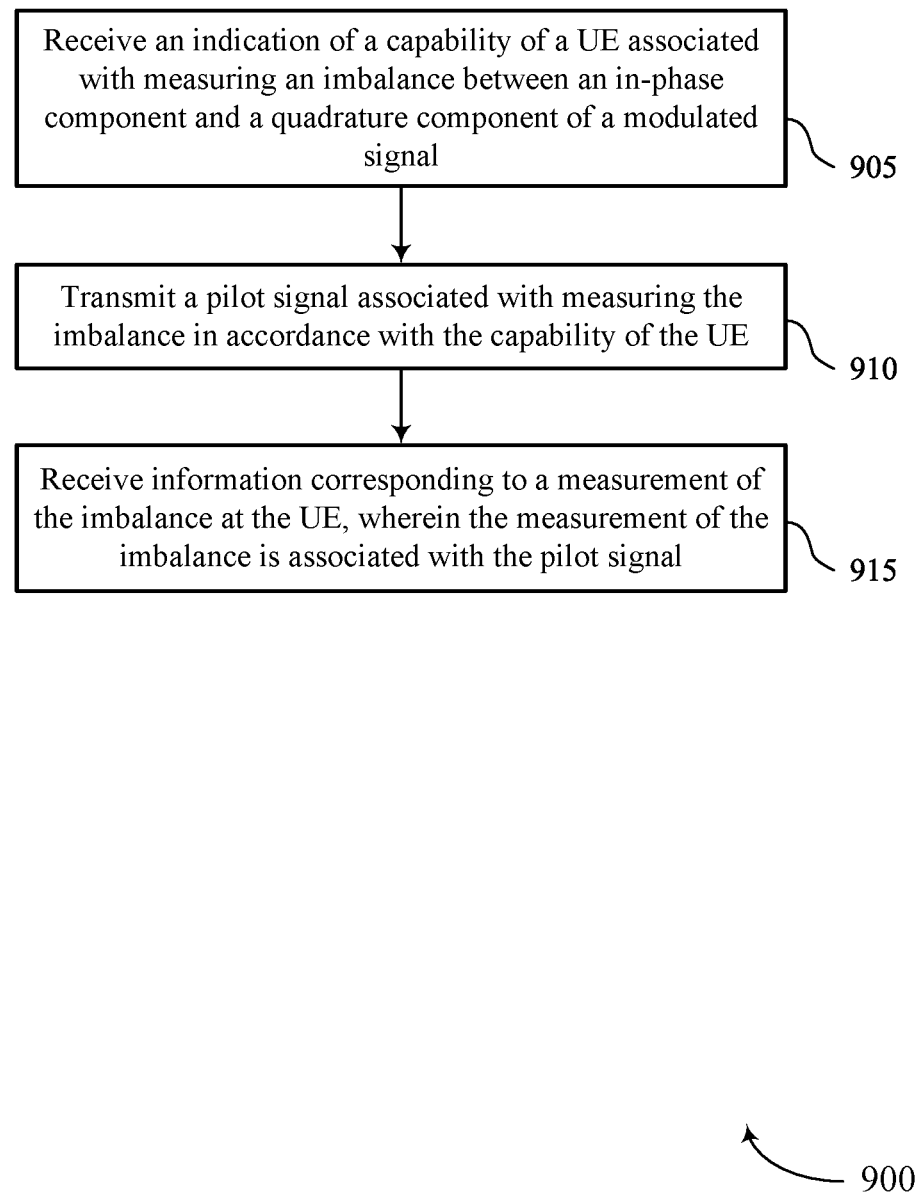

FIG. 9 shows a flowchart illustrating an example method 900 that supports dedicated pilot signals associated with radio frequency impairment compensation. The operations of the method 900 may be implemented by a network entity or its components as described herein. For example, the operations of the method 900 may be performed by a network entity as described with reference to FIGS. 1-5 and 7. In some implementations, a network entity may execute a set of instructions to control the functional elements of the network entity to perform the described functions. Additionally, or alternatively, the network entity may perform aspects of the described functions using special-purpose hardware.

At 905, the method may include receiving an indication of a capability of a UE associated with measuring an imbalance between an in-phase component and a quadrature component of a modulated signal. The operations of 905 may be performed in accordance with implementations as disclosed herein.

At 910, the method may include transmitting a pilot signal associated with measuring the imbalance in accordance with the capability of the UE. The operations of 910 may be performed in accordance with implementations as disclosed herein.

At 915, the method may include receiving information corresponding to a measurement of the imbalance at the UE, where the measurement of the imbalance is associated with the pilot signal. The operations of 915 may be performed in accordance with implementations as disclosed herein.

The following provides an overview of some aspects of the present disclosure:

Aspect 1: A method for wireless communication at a UE, including: transmitting an indication of a capability of the UE associated with measuring an imbalance between an in-phase component and a quadrature component of a modulated signal; monitoring a wireless channel for a pilot signal associated with measuring the imbalance in accordance with the capability of the UE; and transmitting information corresponding to a measurement of the imbalance at the UE, where the measurement of the imbalance is associated with the pilot signal.

Aspect 2: The method of aspect 1, further including: receiving an indication of a set of parameters associated with the pilot signal in accordance with the capability of the UE, where receiving the pilot signal is associated with the set of parameters.

Aspect 3: The method of aspect 2, where the set of parameters includes one or more of a pattern associated with the pilot signal per demodulation reference signal port, an indication of a frequency domain resource allocation associated with the pilot signal, or a quantity of slots associated with the pilot signal, or any combination thereof.

Aspect 4: The method of any of aspects 2-3, where the set of parameters includes a quantity of taps associated with a correction filter at the UE, the measurement of the imbalance at the UE is further associated with the quantity of taps.

Aspect 5: The method of any of aspects 1-4, where transmitting the indication of the capability of the UE includes: transmitting an indication of an IQ imbalance correction technique supported by the UE, an indication of a frequency domain resource allocation supported by the UE for the pilot signal, or an indication of whether the UE expects to measure the imbalance between the in-phase component and the quadrature component of the modulated signal, or any combination thereof.

Aspect 6: The method of any of aspects 1-5, where transmitting the information corresponding to the measurement of the imbalance at the UE includes: transmitting an indication of a frequency domain filter response associated with the pilot signal.

Aspect 7: The method of any of aspects 1-6, where transmitting the information corresponding to the measurement of the imbalance at the UE includes: transmitting an indication of a time domain filter response associated with the pilot signal.

Aspect 8: The method of aspect 7, where the time domain filter response is a response, of a set of multiple time domain filter responses, that is most similar to a frequency domain filter response associated with the pilot signal, the time domain filter response being the most similar to the frequency domain filter response is associated with a quantity of taps of a correction filter at the UE.

Aspect 9: The method of any of aspects 1-8, further including: receiving a data message associated with the measurement of the imbalance at the UE, where transmission of the data message compensates for the measurement of the imbalance at the UE.

Aspect 10: The method of any of aspects 1-9, further including: monitoring the wireless channel for a second pilot signal associated with measuring the imbalance in accordance with the capability of the UE; transmitting second information associated with a second measurement of the imbalance between the in-phase component and the quadrature component of the modulated signal at the UE, where the second measurement of the imbalance at the UE is associated with the second pilot signal; and receiving a data message associated with both the measurement of the imbalance at the UE and the second measurement of the imbalance at the UE, where transmission of the data message compensates for the measurement of the imbalance at the UE and the second measurement of the imbalance at the UE.

Aspect 11: The method of any of aspects 1-10, where the measurement of the imbalance at the UE is associated with an FDRSB estimation at the UE.

Aspect 12: A method for wireless communication at a network entity, including: receiving an indication of a capability of a UE associated with measuring an imbalance between an in-phase component and a quadrature component of a modulated signal; transmitting a pilot signal associated with measuring the imbalance in accordance with the capability of the UE; and receiving information corresponding to a measurement of the imbalance at the UE, where the measurement of the imbalance is associated with the pilot signal.

Aspect 13: The method of aspect 12, further including: transmitting an indication of a set of parameters associated with the pilot signal in accordance with the capability of the UE, where transmitting the pilot signal is associated with the set of parameters.

Aspect 14: The method of aspect 13, where the set of parameters includes one or more of a pattern associated with the pilot signal per demodulation reference signal port, an indication of a frequency domain resource allocation associated with the pilot signal, or a quantity of slots associated with the pilot signal, or any combination thereof.

Aspect 15: The method of any of aspects 13-14, where the set of parameters includes a quantity of taps associated with a correction filter at the UE, the measurement of the imbalance at the UE is further associated with the quantity of taps.

Aspect 16: The method of any of aspects 12-15, where receiving the indication of the capability of the UE includes: receiving an indication of an IQ imbalance correction technique supported by the UE, an indication of a frequency domain resource allocation supported by the UE for the pilot signal, or an indication of whether the UE expects to measure the imbalance between the in-phase component and the quadrature component of the modulated signal, or any combination thereof.

Aspect 17: The method of any of aspects 12-16, where receiving the information corresponding to the measurement of the imbalance at the UE includes: receiving an indication of a frequency domain filter response associated with the pilot signal.

Aspect 18: The method of any of aspects 12-17, where receiving the information corresponding to the measurement of the imbalance at the UE includes: receiving an indication of a time domain filter response associated with the pilot signal.

Aspect 19: The method of aspect 18, where the time domain filter response is a response, of a set of multiple time domain filter responses, that is most similar to a frequency domain filter response associated with the pilot signal, the time domain filter response being the most similar to the frequency domain filter response is associated with a quantity of taps of a correction filter at the UE.

Aspect 20: The method of any of aspects 12-19, further including: transmitting a data message associated with the measurement of the imbalance at the UE, where transmission of the data message compensates for the measurement of the imbalance at the UE.

Aspect 21: The method of any of aspects 12-20, further including: transmitting a second pilot signal associated with measuring the imbalance in accordance with the capability of the UE; receiving second information associated with a second measurement of the imbalance between the in-phase component and the quadrature component of the modulated signal at the UE, where the second measurement of the imbalance at the UE is associated with the second pilot signal; and transmitting a data message associated with both the measurement of the imbalance at the UE and the second measurement of the imbalance at the UE, where the data message compensates for the measurement of the imbalance at the UE and the second measurement of the imbalance at the UE.

Aspect 22: The method of any of aspects 12-21, further including: transmitting, to a second network entity, a coordination message associated with a frequency domain resource allocation or a slot associated with the pilot signal, where the coordination message indicates the second network entity to avoid a transmission using the frequency domain resource allocation or the slot associated with the pilot signal.

Aspect 23: The method of any of aspects 12-22, where the measurement of the imbalance at the UE is associated with an FDRSB estimation at the UE.

Aspect 24: An apparatus for wireless communication at a UE, including: one or more interfaces configured to: output an indication of a capability of the UE associated with measuring an imbalance between an in-phase component and a quadrature component of a modulated signal; monitor a wireless channel for a pilot signal associated with measuring the imbalance in accordance with the capability of the UE; and output information corresponding to a measurement of the imbalance at the UE, where the measurement of the imbalance is associated with the pilot signal.

Aspect 25: The apparatus of aspect 24, where the one or more interfaces are further configured to: obtain an indication of a set of parameters associated with the pilot signal in accordance with the capability of the UE, where obtaining the pilot signal is associated with the set of parameters.

Aspect 26: The apparatus of aspect 25, where a pattern associated with the pilot signal per demodulation reference signal port, an indication of a frequency domain resource allocation associated with the pilot signal, or a quantity of slots associated with the pilot signal, or any combination thereof.

Aspect 27: The apparatus of any of aspects 25-26, where the set of parameters includes a quantity of taps associated with a correction filter at the UE, and the measurement of the imbalance at the UE is further associated with the quantity of taps.

Aspect 28: The apparatus of any of aspects 24-27, where, to output the indication of the capability of the UE, the one or more interfaces are further configured to: output an indication of an IQ imbalance correction technique supported by the UE, an indication of a frequency domain resource allocation supported by the UE for the pilot signal, or an indication of whether the UE expects to measure the imbalance between the in-phase component and the quadrature component of the modulated signal, or any combination thereof.

Aspect 29: The apparatus of any of aspects 24-28, where, to output the information corresponding to the measurement of the imbalance at the UE, the one or more interfaces are further configured to: output an indication of a frequency domain filter response associated with the pilot signal.

Aspect 30: The apparatus of any of aspects 24-29, where, to output the information corresponding to the measurement of the imbalance at the UE, the one or more interfaces are further configured to: output an indication of a time domain filter response associated with the pilot signal.

Aspect 31: The apparatus of aspect 30, where the time domain filter response is a response, of a set of multiple time domain filter responses, that is most similar to a frequency domain filter response associated with the pilot signal, and the time domain filter response being the most similar to the frequency domain filter response is associated with a quantity of taps of a correction filter at the UE.

Aspect 32: The apparatus of any of aspects 24-31, where the one or more interfaces are further configured to: obtain a data message associated with the measurement of the imbalance at the UE, where transmission of the data message compensates for the measurement of the imbalance at the UE.

Aspect 33: The apparatus of any of aspects 24-32, where the one or more interfaces are further configured to: monitor the wireless channel for a second pilot signal associated with measuring the imbalance in accordance with the capability of the UE; output second information associated with a second measurement of the imbalance between the in-phase component and the quadrature component of the modulated signal at the UE, where the second measurement of the imbalance at the UE is associated with the second pilot signal; and obtain a data message associated with both the measurement of the imbalance at the UE and the second measurement of the imbalance at the UE, where transmission of the data message compensates for the measurement of the imbalance at the UE and the second measurement of the imbalance at the UE.

Aspect 34: The apparatus of any of aspects 24-33, where the measurement of the imbalance at the UE is associated with an FDRSB estimation at the UE.

Aspect 35: An apparatus for wireless communication at a network entity, including: one or more interfaces configured to: obtain an indication of a capability of a UE associated with measuring an imbalance between an in-phase component and a quadrature component of a modulated signal; output a pilot signal associated with measuring the imbalance in accordance with the capability of the UE; and obtain information corresponding to a measurement of the imbalance at the UE, where the measurement of the imbalance is associated with the pilot signal.

Aspect 36: The apparatus of aspect 35, where the one or more interfaces are further configured to: output an indication of a set of parameters associated with the pilot signal in accordance with the capability of the UE, where outputting the pilot signal is associated with the set of parameters.

Aspect 37: The apparatus of aspect 36, where a pattern associated with the pilot signal per demodulation reference signal port, an indication of a frequency domain resource allocation associated with the pilot signal, or a quantity of slots associated with the pilot signal, or any combination thereof.

Aspect 38: The apparatus of any of aspects 36-37, where the set of parameters includes a quantity of taps associated with a correction filter at the UE, and the measurement of the imbalance at the UE is further associated with the quantity of taps.

Aspect 39: The apparatus of any of aspects 35-38, where, to obtain the indication of the capability of the UE, the one or more interfaces are further configured to: obtain an indication of an IQ imbalance correction technique supported by the UE, an indication of a frequency domain resource allocation supported by the UE for the pilot signal, or an indication of whether the UE expects to measure the imbalance between the in-phase component and the quadrature component of the modulated signal, or any combination thereof.

Aspect 40: The apparatus of any of aspects 35-39, where, to obtain the information corresponding to the measurement of the imbalance at the UE, the one or more interfaces are further configured to: obtain an indication of a frequency domain filter response associated with the pilot signal.

Aspect 41: The apparatus of any of aspects 35-40, where, to receive the information corresponding to the measurement of the imbalance at the UE, the one or more interfaces are further configured to: obtain an indication of a time domain filter response associated with the pilot signal.

Aspect 42: The apparatus of aspect 41, where the time domain filter response is a response, of a set of multiple time domain filter responses, that is most similar to a frequency domain filter response associated with the pilot signal, and the time domain filter response being the most similar to the frequency domain filter response is associated with a quantity of taps of a correction filter at the UE.

Aspect 43: The apparatus of any of aspects 35-42, where the one or more interfaces are further configured to: output a data message associated with the measurement of the imbalance at the UE, where transmission of the data message compensates for the measurement of the imbalance at the UE.

Aspect 44: The apparatus of any of aspects 35-43, where the one or more interfaces are further configured to: output a second pilot signal associated with measuring the imbalance in accordance with the capability of the UE; obtain second information associated with a second measurement of the imbalance between the in-phase component and the quadrature component of the modulated signal at the UE, where the second measurement of the imbalance at the UE is associated with the second pilot signal; and output a data message associated with both the measurement of the imbalance at the UE and the second measurement of the imbalance at the UE, where the data message compensates for the measurement of the imbalance at the UE and the second measurement of the imbalance at the UE.

Aspect 45: The apparatus of any of aspects 35-44, where the one or more interfaces are further configured to: output, to a second network entity, a coordination message associated with a frequency domain resource allocation or a slot associated with the pilot signal, where the coordination message indicates the second network entity to avoid a transmission using the frequency domain resource allocation or the slot associated with the pilot signal.

Aspect 46: The apparatus of any of aspects 35-45, where the measurement of the imbalance at the UE is associated with an FDRSB estimation at the UE.

Aspect 47: An apparatus for wireless communication at a UE, including: means for transmitting an indication of a capability of the UE associated with measuring an imbalance between an in-phase component and a quadrature component of a modulated signal; means for monitoring a wireless channel for a pilot signal associated with measuring the imbalance in accordance with the capability of the UE; and means for transmitting information corresponding to a measurement of the imbalance at the UE, where the measurement of the imbalance is associated with the pilot signal.

Aspect 48: The apparatus of aspect 47, further including: means for receiving an indication of a set of parameters associated with the pilot signal in accordance with the capability of the UE, where receiving the pilot signal is associated with the set of parameters.

Aspect 49: The apparatus of aspect 48, where a pattern associated with the pilot signal per demodulation reference signal port, an indication of a frequency domain resource allocation associated with the pilot signal, or a quantity of slots associated with the pilot signal, or any combination thereof.

Aspect 50: The apparatus of any of aspects 48-49, where the set of parameters includes a quantity of taps associated with a correction filter at the UE, the measurement of the imbalance at the UE is further associated with the quantity of taps.

Aspect 51: The apparatus of any of aspects 47-50, where the means for transmitting the indication of the capability of the UE include: means for transmitting an indication of an IQ imbalance correction technique supported by the UE, an indication of a frequency domain resource allocation supported by the UE for the pilot signal, or an indication of whether the UE expects to measure the imbalance between the in-phase component and the quadrature component of the modulated signal, or any combination thereof.

Aspect 52: The apparatus of any of aspects 47-51, where the means for transmitting the information corresponding to the measurement of the imbalance at the UE include: means for transmitting an indication of a frequency domain filter response associated with the pilot signal.

Aspect 53: The apparatus of any of aspects 47-52, where the means for transmitting the information corresponding to the measurement of the imbalance at the UE include: means for transmitting an indication of a time domain filter response associated with the pilot signal.

Aspect 54: The apparatus of aspect 53, where the time domain filter response is a response, of a set of multiple time domain filter responses, that is most similar to a frequency domain filter response associated with the pilot signal, the time domain filter response being the most similar to the frequency domain filter response is associated with a quantity of taps of a correction filter at the UE.

Aspect 55: The apparatus of any of aspects 47-54, further including: means for receiving a data message associated with the measurement of the imbalance at the UE, where transmission of the data message compensates for the measurement of the imbalance at the UE.

Aspect 56: The apparatus of any of aspects 47-55, further including: means for monitoring the wireless channel for a second pilot signal associated with measuring the imbalance in accordance with the capability of the UE; means for transmitting second information associated with a second measurement of the imbalance between the in-phase component and the quadrature component of the modulated signal at the UE, where the second measurement of the imbalance at the UE is associated with the second pilot signal; and means for receiving a data message associated with both the measurement of the imbalance at the UE and the second measurement of the imbalance at the UE, where transmission of the data message compensates for the measurement of the imbalance at the UE and the second measurement of the imbalance at the UE.

Aspect 57: The apparatus of any of aspects 47-56, where the measurement of the imbalance at the UE is associated with an FDRSB estimation at the UE.

Aspect 58: An apparatus for wireless communication at a network entity, including: means for receiving an indication of a capability of a UE associated with measuring an imbalance between an in-phase component and a quadrature component of a modulated signal; means for transmitting a pilot signal associated with measuring the imbalance in accordance with the capability of the UE; and means for receiving information corresponding to a measurement of the imbalance at the UE, where the measurement of the imbalance is associated with the pilot signal.

Aspect 59: The apparatus of aspect 58, further including: means for transmitting an indication of a set of parameters associated with the pilot signal in accordance with the capability of the UE, where transmitting the pilot signal is associated with the set of parameters.

Aspect 60: The apparatus of aspect 59, where a pattern associated with the pilot signal per demodulation reference signal port, an indication of a frequency domain resource allocation associated with the pilot signal, or a quantity of slots associated with the pilot signal, or any combination thereof.

Aspect 61: The apparatus of any of aspects 59-60, where the set of parameters includes a quantity of taps associated with a correction filter at the UE, the measurement of the imbalance at the UE is further associated with the quantity of taps.

Aspect 62: The apparatus of any of aspects 58-61, where the means for receiving the indication of the capability of the UE include: means for receiving an indication of an IQ imbalance correction technique supported by the UE, an indication of a frequency domain resource allocation supported by the UE for the pilot signal, or an indication of whether the UE expects to measure the imbalance between the in-phase component and the quadrature component of the modulated signal, or any combination thereof.

Aspect 63: The apparatus of any of aspects 58-62, where the means for receiving the information corresponding to the measurement of the imbalance at the UE include: means for receiving an indication of a frequency domain filter response associated with the pilot signal.

Aspect 64: The apparatus of any of aspects 58-63, where the means for receiving the information corresponding to the measurement of the imbalance at the UE include: means for receiving an indication of a time domain filter response associated with the pilot signal.

Aspect 65: The apparatus of aspect 64, where the time domain filter response is a response, of a set of multiple time domain filter responses, that is most similar to a frequency domain filter response associated with the pilot signal, the time domain filter response being the most similar to the frequency domain filter response is associated with a quantity of taps of a correction filter at the UE.

Aspect 66: The apparatus of any of aspects 58-65, further including: means for transmitting a data message associated with the measurement of the imbalance at the UE, where transmission of the data message compensates for the measurement of the imbalance at the UE.

Aspect 67: The apparatus of any of aspects 58-66, further including: means for transmitting a second pilot signal associated with measuring the imbalance in accordance with the capability of the UE; means for receiving second information associated with a second measurement of the imbalance between the in-phase component and the quadrature component of the modulated signal at the UE, where the second measurement of the imbalance at the UE is associated with the second pilot signal; and means for transmitting a data message associated with both the measurement of the imbalance at the UE and the second measurement of the imbalance at the UE, where the data message compensates for the measurement of the imbalance at the UE and the second measurement of the imbalance at the UE.

Aspect 68: The apparatus of any of aspects 58-67, further including: means for transmitting, to a second network entity, a coordination message associated with a frequency domain resource allocation or a slot associated with the pilot signal, where the coordination message indicates the second network entity to avoid a transmission using the frequency domain resource allocation or the slot associated with the pilot signal.

Aspect 69: The apparatus of any of aspects 58-68, where the measurement of the imbalance at the UE is associated with an FDRSB estimation at the UE.

Aspect 70: A non-transitory computer-readable medium storing code for wireless communication at a UE, the code including instructions executable by a processor to: transmit an indication of a capability of the UE associated with measuring an imbalance between an in-phase component and a quadrature component of a modulated signal; monitor a wireless channel for a pilot signal associated with measuring the imbalance in accordance with the capability of the UE; and transmit information corresponding to a measurement of the imbalance at the UE, where the measurement of the imbalance is associated with the pilot signal.

Aspect 71: The non-transitory computer-readable medium of aspect 70, where the instructions are further executable by the processor to: receive an indication of a set of parameters associated with the pilot signal in accordance with the capability of the UE, where receiving the pilot signal is associated with the set of parameters.

Aspect 72: The non-transitory computer-readable medium of aspect 71, where a pattern associated with the pilot signal per demodulation reference signal port, an indication of a frequency domain resource allocation associated with the pilot signal, or a quantity of slots associated with the pilot signal, or any combination thereof.

Aspect 73: The non-transitory computer-readable medium of any of aspects 71-72, where the set of parameters includes a quantity of taps associated with a correction filter at the UE, the measurement of the imbalance at the UE is further associated with the quantity of taps.

Aspect 74: The non-transitory computer-readable medium of any of aspects 70-73, where the instructions to transmit the indication of the capability of the UE are executable by the processor to: transmit an indication of an IQ imbalance correction technique supported by the UE, an indication of a frequency domain resource allocation supported by the UE for the pilot signal, or an indication of whether the UE expects to measure the imbalance between the in-phase component and the quadrature component of the modulated signal, or any combination thereof.

Aspect 75: The non-transitory computer-readable medium of any of aspects 70-74, where the instructions to transmit the information corresponding to the measurement of the imbalance at the UE are executable by the processor to: transmit an indication of a frequency domain filter response associated with the pilot signal.

Aspect 76: The non-transitory computer-readable medium of any of aspects 70-75, where the instructions to transmit the information corresponding to the measurement of the imbalance at the UE are executable by the processor to: transmit an indication of a time domain filter response associated with the pilot signal.

Aspect 77: The non-transitory computer-readable medium of aspect 76, where the time domain filter response is a response, of a set of multiple time domain filter responses, that is most similar to a frequency domain filter response associated with the pilot signal, the time domain filter response being the most similar to the frequency domain filter response is associated with a quantity of taps of a correction filter at the UE.

Aspect 78: The non-transitory computer-readable medium of any of aspects 70-77, where the instructions are further executable by the processor to: receive a data message associated with the measurement of the imbalance at the UE, where transmission of the data message compensates for the measurement of the imbalance at the UE.

Aspect 79: The non-transitory computer-readable medium of any of aspects 70-78, where the instructions are further executable by the processor to: monitor the wireless channel for a second pilot signal associated with measuring the imbalance in accordance with the capability of the UE; transmit second information associated with a second measurement of the imbalance between the in-phase component and the quadrature component of the modulated signal at the UE, where the second measurement of the imbalance at the UE is associated with the second pilot signal; and receive a data message associated with both the measurement of the imbalance at the UE and the second measurement of the imbalance at the UE, where transmission of the data message compensates for the measurement of the imbalance at the UE and the second measurement of the imbalance at the UE.

Aspect 80: The non-transitory computer-readable medium of any of aspects 70-79, where the measurement of the imbalance at the UE is associated with an FDRSB estimation at the UE.

Aspect 81: A non-transitory computer-readable medium storing code for wireless communication at a network entity, the code including instructions executable by a processor to: receive an indication of a capability of a UE associated with measuring an imbalance between an in-phase component and a quadrature component of a modulated signal; transmit a pilot signal associated with measuring the imbalance in accordance with the capability of the UE; and receive information corresponding to a measurement of the imbalance at the UE, where the measurement of the imbalance is associated with the pilot signal.

Aspect 82: The non-transitory computer-readable medium of aspect 81, where the instructions are further executable by the processor to: transmit an indication of a set of parameters associated with the pilot signal in accordance with the capability of the UE, where transmitting the pilot signal is associated with the set of parameters.

Aspect 83: The non-transitory computer-readable medium of aspect 82, where a pattern associated with the pilot signal per demodulation reference signal port, an indication of a frequency domain resource allocation associated with the pilot signal, or a quantity of slots associated with the pilot signal, or any combination thereof.

Aspect 84: The non-transitory computer-readable medium of any of aspects 82-83, where the set of parameters includes a quantity of taps associated with a correction filter at the UE, the measurement of the imbalance at the UE is further associated with the quantity of taps.

Aspect 85: The non-transitory computer-readable medium of any of aspects 81-84, where the instructions to receive the indication of the capability of the UE are executable by the processor to: receive an indication of an IQ imbalance correction technique supported by the UE, an indication of a frequency domain resource allocation supported by the UE for the pilot signal, or an indication of whether the UE expects to measure the imbalance between the in-phase component and the quadrature component of the modulated signal, or any combination thereof.

Aspect 86: The non-transitory computer-readable medium of any of aspects 81-85, where the instructions to receive the information corresponding to the measurement of the imbalance at the UE are executable by the processor to: receive an indication of a frequency domain filter response associated with the pilot signal.

Aspect 87: The non-transitory computer-readable medium of any of aspects 81-86, where the instructions to receive the information corresponding to the measurement of the imbalance at the UE are executable by the processor to: receive an indication of a time domain filter response associated with the pilot signal.

Aspect 88: The non-transitory computer-readable medium of aspect 87, where the time domain filter response is a response, of a set of multiple time domain filter responses, that is most similar to a frequency domain filter response associated with the pilot signal, the time domain filter response being the most similar to the frequency domain filter response is associated with a quantity of taps of a correction filter at the UE.

Aspect 89: The non-transitory computer-readable medium of any of aspects 81-88, where the instructions are further executable by the processor to: transmit a data message associated with the measurement of the imbalance at the UE, where transmission of the data message compensates for the measurement of the imbalance at the UE.

Aspect 90: The non-transitory computer-readable medium of any of aspects 81-89, where the instructions are further executable by the processor to: transmit a second pilot signal associated with measuring the imbalance in accordance with the capability of the UE; receive second information associated with a second measurement of the imbalance between the in-phase component and the quadrature component of the modulated signal at the UE, where the second measurement of the imbalance at the UE is associated with the second pilot signal; and transmit a data message associated with both the measurement of the imbalance at the UE and the second measurement of the imbalance at the UE, where the data message compensates for the measurement of the imbalance at the UE and the second measurement of the imbalance at the UE.

Aspect 91: The non-transitory computer-readable medium of any of aspects 81-90, where the instructions are further executable by the processor to: transmit, to a second network entity, a coordination message associated with a frequency domain resource allocation or a slot associated with the pilot signal, where the coordination message indicates the second network entity to avoid a transmission using the frequency domain resource allocation or the slot associated with the pilot signal.

Aspect 92: The non-transitory computer-readable medium of any of aspects 81-91, where the measurement of the imbalance at the UE is associated with an FDRSB estimation at the UE.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A user equipment (UE), comprising:
a processing system that includes one or more processors and one or more memories coupled with the one or more processors, the processing system configured to cause the UE to:
output an indication of a capability of the UE associated with measuring to measure an imbalance between an in-phase component and a quadrature component of a modulated signal;
monitor a wireless channel for a pilot signal associated with measuring the imbalance in accordance with the capability of the UE; and
output information corresponding to a measurement of the imbalance at the UE, wherein the measurement of the imbalance is associated with the pilot signal.

2. The UE of claim 1, wherein the processing system is further configured to cause the UE to:
obtain an indication of a set of parameters associated with the pilot signal in accordance with the capability of the UE, wherein obtaining the pilot signal is associated with the set of parameters.

3. The UE of claim 2, wherein the set of parameters associated with the pilot signal comprises a pattern associated with the pilot signal per demodulation reference signal port, an indication of a frequency domain resource allocation associated with the pilot signal, or a quantity of slots associated with the pilot signal, or any combination thereof.

4. The UE of claim 2, wherein the set of parameters includes a quantity of taps associated with a correction filter at the UE, and wherein the measurement of the imbalance at the UE is further associated with the quantity of taps.

5. The UE of claim 1, wherein, to output the indication of the capability of the UE, processing system is further configured to cause the UE to:

output an indication of an in-phase and quadrature imbalance correction technique supported by the UE, an indication of a frequency domain resource allocation supported by the UE for the pilot signal, or an indication of whether the UE expects to measure the imbalance between the in-phase component and the quadrature component of the modulated signal, or any combination thereof.

6. The UE of claim 1, wherein, to output the information corresponding to the measurement of the imbalance at the UE, the processing system is further configured to cause the UE to:
output an indication of a frequency domain filter response associated with the pilot signal.

7. The UE of claim 1, wherein, to output the information corresponding to the measurement of the imbalance at the UE, the processing system is further configured to cause the UE to:
output an indication of a time domain filter response associated with the pilot signal.

8. The UE of claim 7, wherein the time domain filter response is a response, of a plurality of time domain filter responses, that is most similar to a frequency domain filter response associated with the pilot signal, and wherein the time domain filter response being the most similar to the frequency domain filter response is associated with a quantity of taps of a correction filter at the UE.

9. The UE of claim 1, wherein the processing system is further configured to cause the UE to:
obtain a data message associated with the measurement of the imbalance at the UE, wherein transmission of the data message compensates for the measurement of the imbalance at the UE.

10. The UE of claim 1, wherein the processing system is further configured to cause the UE to:
monitor the wireless channel for a second pilot signal associated with measuring the imbalance in accordance with the capability of the UE;
output second information associated with a second measurement of the imbalance between the in-phase component and the quadrature component of the modulated signal at the UE, wherein the second measurement of the imbalance at the UE is associated with the second pilot signal; and
obtain a data message associated with both the measurement of the imbalance at the UE and the second measurement of the imbalance at the UE, wherein transmission of the data message compensates for the measurement of the imbalance at the UE and the second measurement of the imbalance at the UE.

11. A network entity, comprising:
a processing system that includes one or more processors and one or more memories coupled with the processors, the processing system configured to cause the network entity to:
obtain an indication of a capability of a user equipment (UE) to measure an imbalance between an in-phase component and a quadrature component of a modulated signal;
output a pilot signal associated with measuring the imbalance in accordance with the capability of the UE; and
obtain information corresponding to a measurement of the imbalance at the UE, wherein the measurement of the imbalance is associated with the pilot signal.

12. The network entity of claim 11, wherein the processing system is further configured to cause the network entity to:
output an indication of a set of parameters associated with the pilot signal in accordance with the capability of the UE, wherein outputting the pilot signal is associated with the set of parameters.

13. The network entity of claim 11, wherein, to obtain the indication of the capability of the UE, the processing system is further configured to cause the network entity to:
obtain an indication of an in-phase and quadrature imbalance correction technique supported by the UE, an indication of a frequency domain resource allocation supported by the UE for the pilot signal, or an indication of whether the UE expects to measure the imbalance between the in-phase component and the quadrature component of the modulated signal, or any combination thereof.

14. The network entity of claim 11, wherein the processing system is further configured to cause the network entity to:
output a data message associated with the measurement of the imbalance at the UE, wherein transmission of the data message compensates for the measurement of the imbalance at the UE.

15. The network entity of claim 11, wherein the processing system is further configured to cause the network entity to:
output, to a second network entity, a coordination message associated with a frequency domain resource allocation or a slot associated with the pilot signal, wherein the coordination message indicates the second network entity to avoid a transmission using the frequency domain resource allocation or the slot associated with the pilot signal.

16. A method for wireless communication at a user equipment (UE), comprising:
transmitting an indication of a capability of the UE to measure an imbalance between an in-phase component and a quadrature component of a modulated signal;
monitoring a wireless channel for a pilot signal associated with measuring the imbalance in accordance with the capability of the UE; and
transmitting information corresponding to a measurement of the imbalance at the UE, wherein the measurement of the imbalance is associated with the pilot signal.

17. The method of claim 16, further comprising:
receiving an indication of a set of parameters associated with the pilot signal in accordance with the capability of the UE, wherein receiving the pilot signal is associated with the set of parameters.

18. The method of claim 16, wherein transmitting the indication of the capability of the UE comprises:
transmitting an indication of an in-phase and quadrature imbalance correction technique supported by the UE, an indication of a frequency domain resource allocation supported by the UE for the pilot signal, or an indication of whether the UE expects to measure the imbalance between the in-phase component and the quadrature component of the modulated signal, or any combination thereof.

19. The method of claim 16, wherein transmitting the information corresponding to the measurement of the imbalance at the UE comprises:
transmitting an indication of a frequency domain filter response associated with the pilot signal.

20. The method of claim 16, wherein transmitting the information corresponding to the measurement of the imbalance at the UE comprises:
transmitting an indication of a time domain filter response associated with the pilot signal.

* * * * *